United States Patent
Sagar et al.

(10) Patent No.: US 10,725,826 B1
(45) Date of Patent: Jul. 28, 2020

(54) SERIALIZING DURATION-LIMITED TASK EXECUTIONS IN AN ON DEMAND CODE EXECUTION SYSTEM

(71) Applicant: Amazon Technologies, Inc., Seattle, WA (US)

(72) Inventors: Sahil Sagar, Piscataway, NJ (US); Michael Raposa, White Plains, NY (US)

(73) Assignee: Amazon Technologies, Inc., Seattle, WA (US)

( * ) Notice: Subject to any disclaimer, the term of this patent is extended or adjusted under 35 U.S.C. 154(b) by 28 days.

(21) Appl. No.: 15/629,546

(22) Filed: Jun. 21, 2017

(51) Int. Cl.
*G06F 9/46* (2006.01)
*G06F 9/50* (2006.01)
*G06F 9/455* (2018.01)

(52) U.S. Cl.
CPC ........ *G06F 9/5038* (2013.01); *G06F 9/45508* (2013.01); *G06F 9/45558* (2013.01); *G06F 2009/45583* (2013.01); *G06F 2009/45591* (2013.01); *G06F 2009/45595* (2013.01)

(58) Field of Classification Search
CPC .................................................... G06F 9/4881
USPC ........................................................ 718/107
See application file for complete search history.

(56) References Cited

U.S. PATENT DOCUMENTS

| | | | | |
|---|---|---|---|---|
| 6,260,058 B1 * | 7/2001 | Hoenninger | .......... | G06F 9/4887 718/103 |
| 8,127,284 B2 * | 2/2012 | Meijer | ................ | G06F 9/44521 717/166 |
| 9,811,363 B1 * | 11/2017 | Wagner | ................ | G06F 9/44521 |
| 9,811,434 B1 * | 11/2017 | Wagner | ................ | G06F 9/45516 |
| 2003/0191795 A1 * | 10/2003 | Bernardin | ................ | G06F 9/505 718/105 |
| 2004/0044721 A1 * | 3/2004 | Song | ................ | H04L 29/06 709/202 |
| 2006/0080678 A1 * | 4/2006 | Bailey | ................ | G06F 9/466 719/325 |
| 2006/0155800 A1 * | 7/2006 | Matsumoto | ........... | G06F 9/4856 709/200 |
| 2007/0033085 A1 * | 2/2007 | Johnson | ................ | G06Q 10/109 705/7.21 |
| 2007/0050779 A1 * | 3/2007 | Hayashi | ................ | G06F 9/4887 718/108 |

(Continued)

*Primary Examiner* — Mehran Kamran
(74) *Attorney, Agent, or Firm* — Knobbe, Martens, Olson & Bear, LLP

(57) ABSTRACT

Systems and methods are described for conducting data processing against a target data set using multiple, duration-limited task executions in an on-demand code execution system. The on-demand code execution system can enable execution of user-specified code as a task, but may establish duration limits for each task execution. Such duration limits can sometimes cause a task execution to fail, such as when processing a large data set. To overcome this problem, this disclosure enables data processing to occur over multiple task executions. Each task execution can process a portion of a data set selected such that data processing of the portion can complete prior to expiration of the duration limit. If an additional portion remains, the task execution can generate state information to enable an additional execution to conduct data processing on an additional portion, and pass that state information within a call to start the additional execution.

20 Claims, 8 Drawing Sheets

(56) References Cited

U.S. PATENT DOCUMENTS

| | | | | |
|---|---|---|---|---|
| 2007/0101325 | A1* | 5/2007 | Bystricky | G06F 9/461 718/100 |
| 2008/0115143 | A1* | 5/2008 | Shimizu | G06F 9/5066 718/105 |
| 2009/0183162 | A1* | 7/2009 | Kindel | G06F 9/4843 718/103 |
| 2010/0094816 | A1* | 4/2010 | Groves, Jr. | G06F 16/289 707/697 |
| 2011/0029984 | A1* | 2/2011 | Norman | G05B 19/41865 718/106 |
| 2012/0011511 | A1* | 1/2012 | Horvitz | G06F 9/461 718/100 |
| 2012/0102493 | A1* | 4/2012 | Allen | G06F 9/4881 718/101 |
| 2013/0061220 | A1* | 3/2013 | Gnanasambandam | G06F 9/45558 718/1 |
| 2013/0346470 | A1* | 12/2013 | Obstfeld | G06F 9/5044 709/202 |
| 2014/0229221 | A1* | 8/2014 | Shih | G06Q 10/06313 705/7.23 |
| 2014/0282559 | A1* | 9/2014 | Verduzco | G06Q 10/10 718/102 |
| 2015/0067019 | A1* | 3/2015 | Balko | H04L 67/10 709/202 |
| 2015/0324229 | A1* | 11/2015 | Valine | G06F 9/4887 718/104 |
| 2015/0332195 | A1* | 11/2015 | Jue | G06Q 10/06316 705/7.26 |
| 2016/0011901 | A1* | 1/2016 | Hurwitz | G06F 9/4843 718/101 |
| 2016/0092320 | A1* | 3/2016 | Baca | G06F 11/1641 714/49 |
| 2016/0212007 | A1* | 7/2016 | Alatorre | G06F 9/5066 |
| 2017/0060615 | A1* | 3/2017 | Thakkar | G06F 9/45558 |
| 2017/0329578 | A1* | 11/2017 | Iscen | G06F 8/31 |
| 2017/0371706 | A1* | 12/2017 | Wagner | G06F 9/52 |
| 2017/0371720 | A1* | 12/2017 | Basu | G06F 9/52 |
| 2017/0372142 | A1* | 12/2017 | Bilobrov | G06K 9/00744 |
| 2018/0081717 | A1* | 3/2018 | Li | G06F 9/4881 |
| 2018/0095738 | A1* | 4/2018 | Durkop | G06F 8/451 |
| 2018/0192101 | A1* | 7/2018 | Bilobrov | H04N 21/4627 |
| 2018/0239636 | A1* | 8/2018 | Arora | G06F 9/485 |
| 2018/0253333 | A1* | 9/2018 | Gupta | G06F 9/4856 |

* cited by examiner

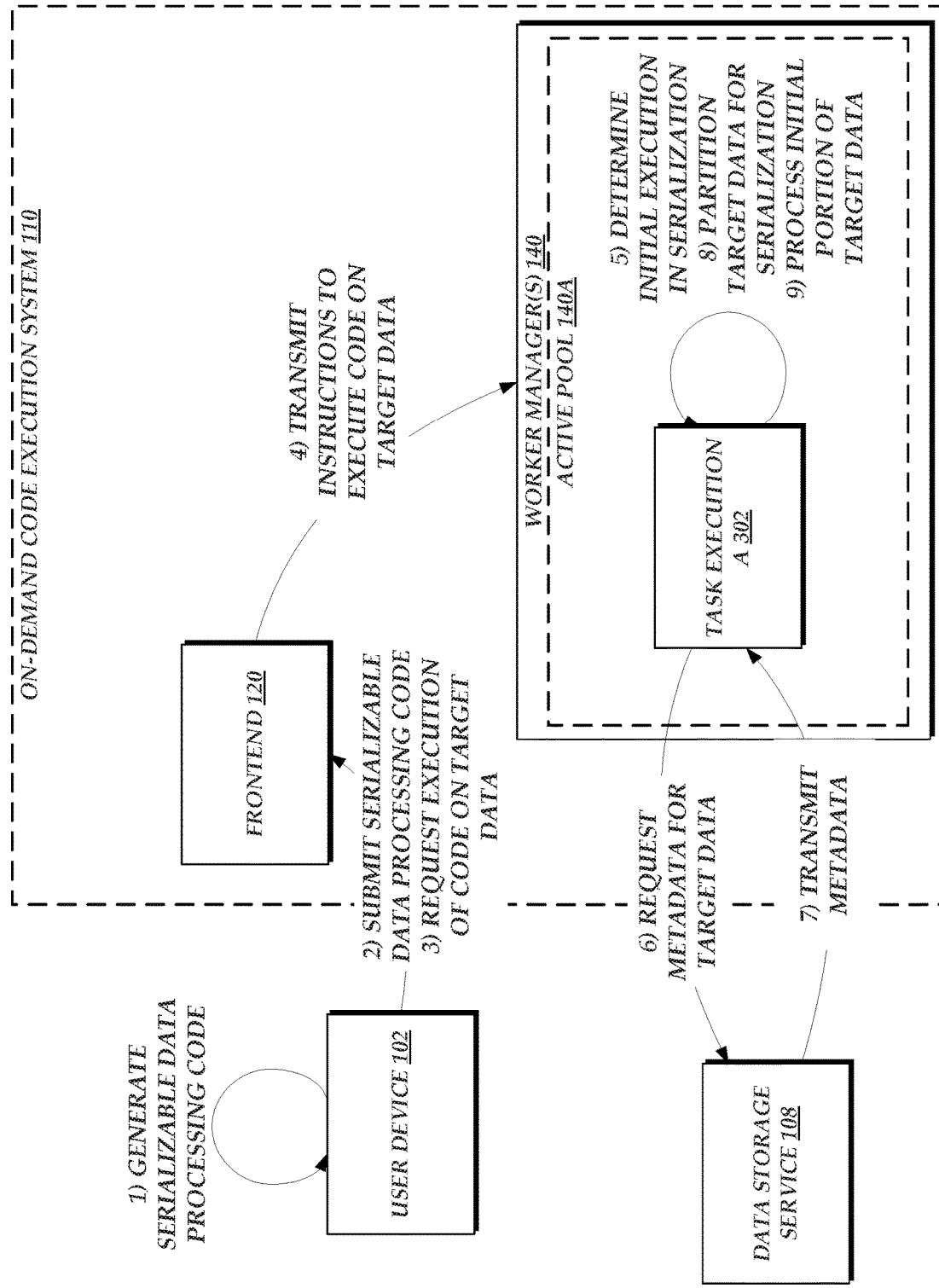

SERIALIZING DURATION-LIMITED TASK EXECUTIONS IN AN ON DEMAND CODE EXECUTION SYSTEM

BACKGROUND

Computing devices can utilize communication networks to exchange data. Companies and organizations operate computer networks that interconnect a number of computing devices to support operations or to provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources.

In some scenarios, virtual machine instances may be configured according to a number of virtual machine instance types to provide specific functionality. For example, various computing devices may be associated with different combinations of operating systems or operating system configurations, virtualized hardware resources and software applications to enable a computing device to provide different desired functionalities, or to provide similar functionalities more efficiently. These virtual machine instance type configurations are often contained within a device image, which includes static data containing the software (e.g., the OS and applications together with their configuration and data files, etc.) that the virtual machine will run once started. The device image is typically stored on the disk used to create or initialize the instance. Thus, a computing device may process the device image in order to implement the desired software configuration.

BRIEF DESCRIPTION OF DRAWINGS

FIGS. 3A and 3B are flow diagrams depicting illustrative interactions for serializing execution of code for processing a set of data, such that the data is processed across multiple duration-limited task executions on the on-demand code execution system of FIG. 1;

DETAILED DESCRIPTION

Figure 1:
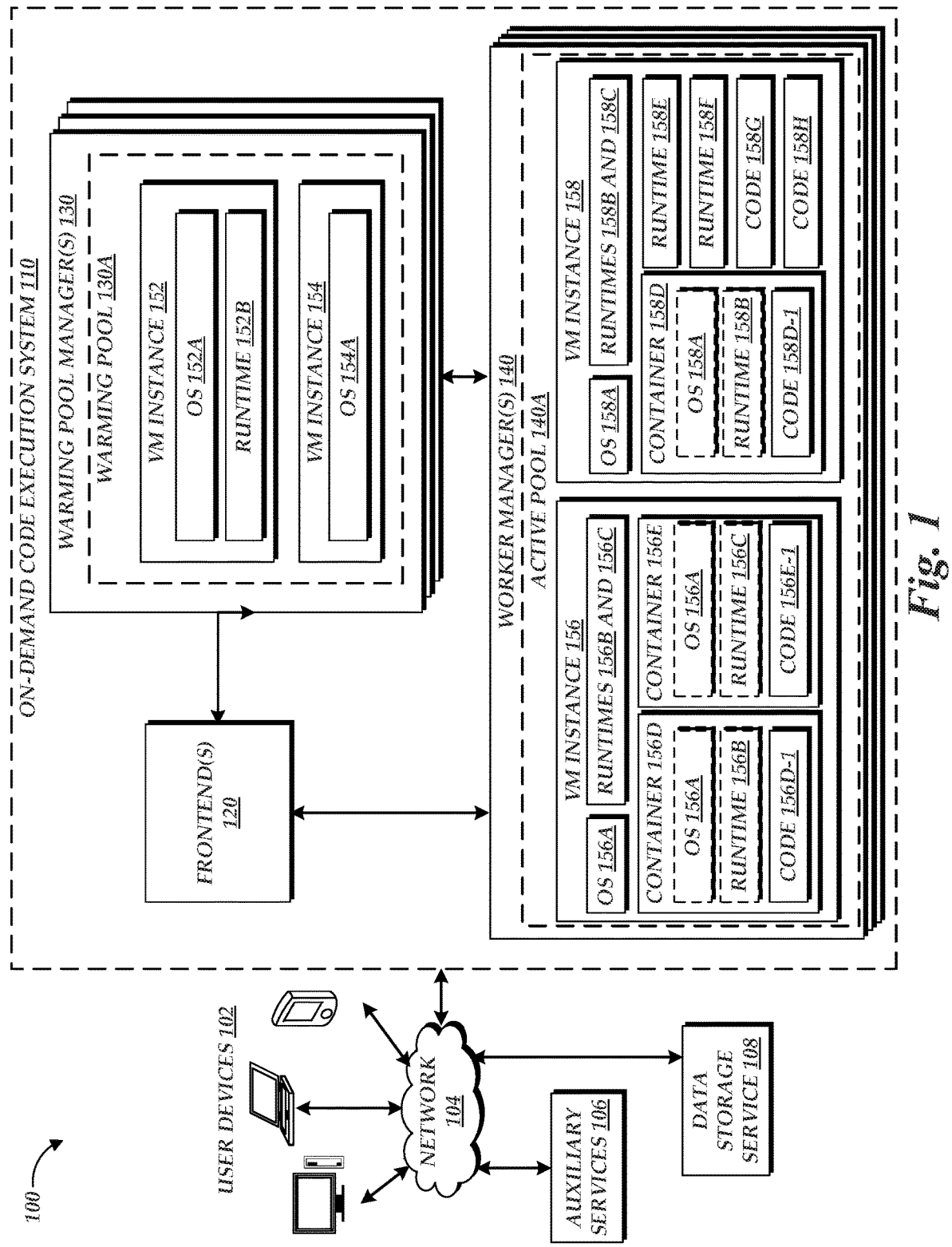
FIG. 1 is a block diagram depicting an illustrative environment in which an on-demand code execution system can operate to execute tasks corresponding to code, which may be submitted by users of the on-demand code execution system, and to enable serializing execution of such code across multiple, duration-limited task executions.

Generally described, aspects of the present disclosure relate to an on-demand code execution system. The on-demand code execution system enables rapid execution of code, which may be supplied by users of the on-demand code execution system. More specifically, aspects of the present disclosure enable the on-demand code execution system to "serialize" execution of code, such that the code is implemented across multiple, duration-limited code executions. Such serialization may be beneficial, for example, in instances where the on-demand code execution system limits a duration of an individual code execution. While establishing duration limits for code execution may provide benefits to the on-demand code execution (such as preventing individual executions from tying up resources for extended periods), such duration-limits may also inhibit code from implementing beneficial functionalities. For example, code intended to process large amounts of data may be unable to complete within the established duration limit, and thus be difficult to implement on the on-demand code execution system. The present disclosure addresses this problem by enabling serialization of code across multiple, duration-limited code executions, such that no individual code execution exceeds a duration limit on the on-demand code execution system. Specifically, in accordance with embodiments of the present disclosure, the on-demand code execution system can be configured by each duration-limited code execution to determine when a duration limit is approaching, and to initiate execution of a subsequent duration-limited code execution from a point determined based on a state of the past duration-limited code execution. In this manner, desired functionality can be spread across multiple duration-limited code execution, even if that desired functionality would, under a single execution, take longer than the duration limit to execute.

In one embodiment, serialized code execution may occur with respect to data processing code. Illustratively, a user may define code that executes to process a data set (e.g., a file, a content stream, etc.) to result in processed data. However, the data set may be too large to process within a single duration-limited code execution. As such, the code may be configured such that a first execution of the code on the on-demand code execution system partitions the data set for serialization, assigning each segment of the data set for processing by a different duration-limited code execution. The first execution of the code may then process an initial segment and determine an output (if any). Thereafter, to prevent the first execution from exceeding a duration limit of the on-demand code execution system, the first code execution can generate a call to the on-demand code execution system that requests a subsequent execution of the code, and that provides state information regarding the first code execution, such as the determined partition of the data set and a portion processed by the first code execution. The on-demand code execution system may respond to the call by initiating a second execution of the code, which configures the on-demand code execution system to process a second portion of the code, as indicated by the state information within the request. Each execution may continue to process a portion of the data set and to call for additional executions, until the entire data set is processed. Thus, rather than attempting to process a data set within a single execution (potentially violating duration limits), the processing may be spread across multiple duration-limited executions.

Numerous implementations for data processing across serialized, duration-limited task executions exist. For example, such data processing may be utilized to generate checksum values of files too large to process within a single execution, due to duration limits on such execution. Illustratively, a user may submit code to the on-demand code execution system that generates checksum values (e.g., a relatively small value used to check the integrity of a relatively larger data set) according to the message digest 5 (MD5) hash function. The MD5 hash function, which is known in the art, operates to iteratively process fixed-length (512 bit) blocks of data. Each block of data within a file may be processed to result in a fixed-length output (of 128 bits), which output is then used as an input to processing a subsequent block of data. An output of processing the 512-bit block of data (or portion of a 512 block, in the instance that a file does not include data evenly divisible into 512-bit blocks) represents the MD5 hash of that file. This MD5 hash function is often used to verify the integrity when transferring data across communication networks (e.g., to detect errors introduced during transfer). However, processing data sets above a given size (e.g., 5 to 10 gigabytes) may require more time than is allowed under a duration-limit provided by the on-demand code execution system. To address this, the MD5 calculation implementation may be modified to enable serialization of the MD5 hash function. For example, code may be configured to instruct a computing device of the on-demand code execution system to implement the typical MD5 hash algorithm (e.g., in the manner described above) with respect to only a fixed amount of data within a file. The fixed amount of data may be set, for example, by an author of the code at a level that ensures the data can be processed by the algorithm within the duration-limits of the on-demand code execution system. Illustratively, the fixed amount of data may be set to 5 gigabytes (GB). After processing the amount of data, the code may be configured to instruct a computing device of the on-demand code execution system to halt execution of the code, but to call for a subsequent execution of that code, which call includes state information of the immediate execution. Such state information may include, for example, a location of the fixed amount of data relative to all data within the file (e.g., the first 5 GB, a subsequent 5 GB, etc.), a partial output value (e.g., representing a current, partially calculated value for a last 512-bit block processed by the code), and any unprocessed bits within the fixed amount of data (e.g., bits remaining when the fixed amount of data is divided into 512-bit blocks). The on-demand code execution system may respond to the call by initiating a second execution of the code, which causes the on-demand code execution system to implement the MD5 hash algorithm against a next fixed amount of data within the file, using as inputs the state information (e.g., a partially calculated hash value) of the now-prior execution. The second execution of the code may cause the on-demand code execution system to process the fixed amount of data, and if more data exists within the file, to call for additional executions of the code. Subsequent executions may continue until an entirety of the file is processed and an MD5 checksum is produced by a final execution, at which point no further calls to the on-demand code execution system need be made. As such, an MD5 checksum may be generated based on execution of multiple duration-limited code executions, none of which exceed a duration-limit of the on-demand code execution system.

While one illustrative embodiment is described above with respect to generation of MD5 checksums, the on-demand code execution system may implement similar functionalities enable different processing of large data sets. For example, code may cause the on-demand code execution system to process a fixed amount of data within a file according to a video or audio encoding algorithm, write a result of such encoding to a network-based storage device, and call for a subsequent execution of the code to process a subsequent amount of data within the file. The call may include state data of the first execution, such as timestamp values for the encoding, alignment of audio or video frames within the encoded content, etc. In some instances, this functionality may be applied to enable the on-demand code execution system to undertake traditionally long-running processes, such as encoding of streaming (e.g., live) video or audio files.

In another embodiment, an on-demand code execution system may be configured to enable serialization of a variety of iterative processes included within code, based on functions provided by an owner of the code. The term "iterative processes" is generally used herein to processes which include "looped" functionality, where specific functionalities are implemented repeatedly. Illustratively, the use of "for" or "while" loops within code may result in an iterative process. In many instances, an end condition for an iterative process is not fixed or pre-defined. As such, the duration of the iterative process is often similarly unknown prior to execution of the process. In cases where an on-demand code execution system limits the duration of executions, use of such iterative processes can therefore lead to undesirable behavior, such as executions halting prematurely for exceeding the duration limits.

To address this, an on-demand code execution system may enable a user to define serialization and deserialization functions, such that an iterative process can be carried out over multiple duration-limited code executions. Illustratively, the on-demand code execution system may enable a user to designate a location within an iterative process (e.g., a specific line within a loop), as represented in executable code, as a serialization point. During execution of the code, the on-demand code execution system may detect an occurrence of the serialization point, and determine whether a duration limit of a current execution is approaching. If so, the on-demand code execution system may halt the current execution of the code, and call for a subsequent execution. To facilitate maintenance of state across executions, the on-demand code execution system can further enable a user to specify "serialization" and "deserialization" functions corresponding to the iterative process. Specifically, a serialization function may be defined by the user to save a state of the iterative process (e.g., variables necessary to resume the iterative process during a subsequent execution), and to pass that state information to the on-demand code execution system for use in a subsequent execution (e.g., for inclusion in a call for the subsequent execution). A deserialization function may read state information from a call (if present), and initialize variables within the code such that the iterative process can resume from the state indicated by the state information. Accordingly, during execution of the code to implement an iterative process, the on-demand code execution system may detect (at the serialization point) whether a duration limit of a current execution is approaching, and in response, call the serialization function defined by an owner of the code (either within the code itself or separately). The serialization function may encode state information of the iterative process, which the on-demand code execution system may pass in a call to initiate a second execution of the code on the on-demand code execution system. Prior to resuming the iterative process, the on-demand code execution system may call the deserialization function to read the state information, as included within the call, to enable the second code execution to resume the iterative process begun under the initial code execution. This serialization of code executions may repeat until the iterative process has completed. Accordingly, the on-demand code execution environment may enable serialization of any number of iterative processes, based on a user-defined serialization point, serialization function, and deserialization function.

The general execution of tasks on the on-demand code execution system will now be discussed. As described in detail herein, the on-demand code execution system may provide a network-accessible service enabling users to submit or designate computer-executable code to be executed by virtual machine instances on the on-demand code execution system. Each set of code on the on-demand code execution system may define a "task," and implement specific functionality corresponding to that task when executed on a virtual machine instance of the on-demand code execution system. Individual implementations of the task on the on-demand code execution system may be referred to as an "execution" of the task (or a "task execution"). As noted above, task executions may be duration-limited, such that the on-demand code execution system forcibly halts task executions that extend beyond a threshold period of time (e.g., 5 minutes). These duration limits may be established by an administrator of the on-demand code execution system, for example, to ensure that individual executions do not utilize excessive resources of the system, or to ensure availability of the resources of the system to other executions.

The on-demand code execution system can enable users to trigger execution of a task based on a variety of potential events, such as detecting new data at a network-based storage system, transmission of an application programming interface ("API") call to the on-demand code execution system, or transmission of a specially formatted hypertext transport protocol ("HTTP") packet to the on-demand code execution system. Thus, users may utilize the on-demand code execution system to execute any specified executable code "on-demand," without requiring configuration or maintenance of the underlying hardware or infrastructure on which the code is executed. Further, the on-demand code execution system may be configured to execute tasks in a rapid manner (e.g., in under 100 milliseconds [ms]), thus enabling execution of tasks in "real-time" (e.g., with little or no perceptible delay to an end user). To enable this rapid execution, the on-demand code execution system can include one or more virtual machine instances that are "pre-warmed" or pre-initialized (e.g., booted into an operating system and executing a complete or substantially complete runtime environment) and configured to enable execution of user-defined code, such that the code may be rapidly executed in response to a request to execute the code, without delay caused by initializing the virtual machine instance. Thus, when an execution of a task is triggered, the code corresponding to that task can be executed within a pre-initialized virtual machine in a very short amount of time.

To execute tasks, the on-demand code execution system described herein may maintain a pool of pre-initialized virtual machine instances that are ready for use as soon as a user request is received. Due to the pre-initialized nature of these virtual machines, delay (sometimes referred to as latency) associated with executing the user code (e.g., instance and language runtime startup time) can be significantly reduced, often to sub-100 millisecond levels. Illustratively, the on-demand code execution system may maintain a pool of virtual machine instances on one or more physical computing devices, where each virtual machine instance has one or more software components (e.g., operating systems, language runtimes, libraries, etc.) loaded thereon. When the on-demand code execution system receives a request to execute the program code of a user (a "task"), which specifies one or more computing constraints for executing the program code of the user, the on-demand code execution system may select a virtual machine instance for executing the program code of the user based on the one or more computing constraints specified by the request and cause the program code of the user to be executed on the selected virtual machine instance. The program codes can be executed in isolated containers that are created on the virtual machine instances. Since the virtual machine instances in the pool have already been booted and loaded with particular operating systems and language runtimes by the time the requests are received, the delay associated with finding compute capacity that can handle the requests (e.g., by executing the user code in one or more containers created on the virtual machine instances) is significantly reduced.

The on-demand code execution system may include a virtual machine instance manager configured to receive user code (threads, programs, etc., composed in any of a variety of programming languages) and execute the code in a highly scalable, low latency manner, without requiring user configuration of a virtual machine instance. Specifically, the virtual machine instance manager can, prior to receiving the user code and prior to receiving any information from a user regarding any particular virtual machine instance configuration, create and configure virtual machine instances according to a predetermined set of configurations, each corresponding to any one or more of a variety of run-time environments. Thereafter, the virtual machine instance manager receives user-initiated requests to execute code, and identifies a pre-configured virtual machine instance to execute the code based on configuration information associated with the request. The virtual machine instance manager can further allocate the identified virtual machine instance to execute the user's code at least partly by creating and configuring containers inside the allocated virtual machine instance. Various embodiments for implementing a virtual machine instance manager and executing user code on virtual machine instances is described in more detail in U.S. Pat. No. 9,323,556, entitled "PROGRAMMATIC EVENT DETECTION AND MESSAGE GENERATION FOR REQUESTS TO EXECUTE PROGRAM CODE" and filed Sep. 30, 2014 ("the '556 Patent"), the entirety of which is hereby incorporated by reference.

As used herein, the term "virtual machine instance" is intended to refer to an execution of software or other executable code that emulates hardware to provide an environment or platform on which software may execute (an "execution environment"). Virtual machine instances are generally executed by hardware devices, which may differ from the physical hardware emulated by the virtual machine instance. For example, a virtual machine may emulate a first type of processor and memory while being executed on a second type of processor and memory. Thus, virtual machines can be utilized to execute software intended for a first execution environment (e.g., a first operating system) on a physical device that is executing a second execution environment (e.g., a second operating system). In some instances, hardware emulated by a virtual machine instance may be the same or similar to hardware of an underlying device. For example, a device with a first type of processor may implement a plurality of virtual machine instances, each emulating an instance of that first type of processor. Thus, virtual machine instances can be used to divide a device into a number of logical sub-devices (each referred to as a "virtual machine instance"). While virtual machine instances can generally provide a level of abstraction away from the hardware of an underlying physical device, this abstraction is not required. For example, assume a device implements a plurality of virtual machine instances, each of which emulates hardware identical to that provided by the device. Under such a scenario, each virtual machine instance may allow a software application to execute code on the underlying hardware without translation, while maintaining a logical separation between software applications running on other virtual machine instances. This process, which is generally referred to as "native execution," may be utilized to increase the speed or performance of virtual machine instances. Other techniques that allow direct utilization of underlying hardware, such as hardware pass-through techniques, may be used, as well.

While a virtual machine executing an operating system is described herein as one example of an execution environment, other execution environments are also possible. For example, tasks or other processes may be executed within a software "container," which provides a runtime environment without itself providing virtualization of hardware. Containers may be implemented within virtual machines to provide additional security, or may be run outside of a virtual machine instance.

As will be appreciated by one of skill in the art in light of the present disclosure, the embodiments disclosed herein improves the ability of computing systems, such as on-demand code execution systems, to execute code in an efficient manner, enabling both duration-limitations to be applied to individual code executions and execution of processes that would take longer than such a duration limitation if executed in a single instance. Moreover, the presently disclosed embodiments address technical problems inherent within computing systems; specifically, the duration required to execute iterative processes, and the difficulty of enforcing execution duration limits (which provide numerous benefits) without harming execution of long-running iterative processes. These technical problems are addressed by the various technical solutions described herein, including the serialization of iterative functions on an on-demand code execution system, such that a long-running process may be implemented across multiple, duration-limited executions. Thus, the present disclosure represents an improvement on existing data processing systems and computing systems in general.

While aspects of the present disclosure are described as overcoming problems related to duration limits within an on-demand code execution system, embodiments disclosed herein may further address other limitations placed on task executions in such a system. For example, an on-demand code execution system may be configured to limit an amount of memory (e.g., random access memory, or "RAM") accessible by each task execution. By serializing a process across multiple, memory-limited task executions, a total amount of memory available to the process may be increased above the limited amount of memory available to a single task execution. One skilled in the art will appreciate that serialization can enable a process to exceed other limitations placed on an individual task execution by an on-demand code execution system (e.g., limitations on network bandwidth, processing cycles, etc.) in a similar manner.

The foregoing aspects and many of the attendant advantages of this disclosure will become more readily appreciated as the same become better understood by reference to the following description, when taken in conjunction with the accompanying drawings.

FIG. 1 is a block diagram of an illustrative operating environment 100 in which an on-demand code execution system 110 may operate based on communication with user computing devices 102, auxiliary services 106, and network-based data storage services 108. By way of illustration, various example user computing devices 102 are shown in communication with the on-demand code execution system 110, including a desktop computer, laptop, and a mobile phone. In general, the user computing devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. The on-demand code execution system 110 may provide the user computing devices 102 with one or more user interfaces, command-line interfaces (CLI), application programming interfaces (API), and/or other programmatic interfaces for generating and uploading user-executable code, invoking the user-provided code (e.g., submitting a request to execute the user codes on the on-demand code execution system 110), scheduling event-based jobs or timed jobs, tracking the user-provided code, and/or viewing other logging or monitoring information related to their requests and/or user codes. Although one or more embodiments may be described herein as using a user interface, it should be appreciated that such embodiments may, additionally or alternatively, use any CLIs, APIs, or other programmatic interfaces.

The illustrative environment 100 further includes one or more auxiliary services 106, which can interact with the one-demand code execution environment 110 to implement desired functionality on behalf of a user. Auxiliary services 106 can correspond to network-connected computing devices, such as servers, which generate data accessible to the one-demand code execution environment 110 or otherwise communicate to the one-demand code execution environment 110. For example, the auxiliary services 106 can include web services (e.g., associated with the user computing devices 102, with the on-demand code execution system 110, or with third parties), databases, really simple syndication ("RSS") readers, social networking sites, or any other source of network-accessible service or data source. In some instances, auxiliary services 106 may be associated with the on-demand code execution system 110, e.g., to provide billing or logging services to the on-demand code execution system 110. In some instances, auxiliary services 106 actively transmit information, such as API calls or other task-triggering information, to the on-demand code execution system 110. In other instances, auxiliary services 106 may be passive, such that data is made available for access by the on-demand code execution system 110. Components of the on-demand code execution system 110 may periodically poll such passive data sources, and trigger execution of tasks within the on-demand code execution system 110 based on the data provided. While depicted in FIG. 1 as distinct from the user computing devices 102 and the on-demand code execution system 110, in some embodiments, various auxiliary services 106 may be implemented by either the user computing devices 102 or the on-demand code execution system 110.

The illustrative environment 100 further includes one or more network-based data storage services 108, configured to enable the on-demand code execution system 110 to store and retrieve data from one or more persistent or substantially persistent data sources. Illustratively, the network-based data storage services 108 may enable the on-demand code execution system 110 to retrieve data to be processed during execution of a task, and store information (e.g., results) regarding that execution. The network-based data storage services 108 may represent, for example, a relational or non-relational database. In another example, the network-based data storage services 108 may represent a network-attached storage (NAS), configured to provide access to data arranged as a file system. The network-based data storage services 108 may further enable the on-demand code execution system 110 to query for and retrieve information regarding data stored within the on-demand code execution system 110, such as by querying for a number of relevant files or records, sizes of those files or records, file or record names, file or record creation times, etc. In some instances, the network-based data storage services 108 may provide additional functionality, such as the ability to separate data into logical groups (e.g., groups associated with individual accounts, etc.). While shown as distinct from the auxiliary services 106, the network-based data storage services 108 may in some instances also represent a type of auxiliary service 106.

The user computing devices 102, auxiliary services 106, and network-based data storage services 108 may communicate with the on-demand code execution system 110 via network 104, which may include any wired network, wireless network, or combination thereof. For example, the network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The on-demand code execution system 110 is depicted in FIG. 1 as operating in a distributed computing environment including several computer systems that are interconnected using one or more computer networks (not shown in FIG. 1). The on-demand code execution system 110 could also operate within a computing environment having a fewer or greater number of devices than are illustrated in FIG. 1. Thus, the depiction of the on-demand code execution system 110 in FIG. 1 should be taken as illustrative and not limiting to the present disclosure. For example, the on-demand code execution system 110 or various constituents thereof could implement various Web services components, hosted, or "cloud" computing environments, and/or peer to peer network configurations to implement at least a portion of the processes described herein.

Further, the on-demand code execution system 110 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers. In some instances, the one or more servers may operate as part of a system of rapidly provisioned and released computing resources, often referred to as a "cloud computing environment."

In the example of FIG. 1, the on-demand code execution system 110 is illustrated as connected to the network 104. In some embodiments, any of the components within the on-demand code execution system 110 can communicate with other components of the on-demand code execution system 110 via the network 104. In other embodiments, not all components of the on-demand code execution system 110 are capable of communicating with other components of the virtual environment 100. In one example, only the frontend 120 (which may in some instances represent multiple frontends 120) may be connected to the network 104, and other components of the on-demand code execution system 110 may communicate with other components of the environment 100 via the frontends 120.

In FIG. 1, users, by way of user computing devices 102, may interact with the on-demand code execution system 110 to provide executable code, and establish rules or logic defining when and how such code should be executed on the on-demand code execution system 110, thus establishing a "task." For example, a user may wish to run a piece of code in connection with a web or mobile application that the user has developed. One way of running the code would be to acquire virtual machine instances from service providers who provide infrastructure as a service, configure the virtual machine instances to suit the user's needs, and use the configured virtual machine instances to run the code. In order to avoid the complexity of this process, the user may alternatively provide the code to the on-demand code execution system 110, and request that the on-demand code execution system 110 execute the code using one or more pre-established virtual machine instances. The on-demand code execution system 110 can handle the acquisition and configuration of compute capacity (e.g., containers, instances, etc., which are described in greater detail below) based on the code execution request, and execute the code using the compute capacity. The on-demand code execution system 110 may automatically scale up and down based on the volume, thereby relieving the user from the burden of having to worry about over-utilization (e.g., acquiring too little computing resources and suffering performance issues) or under-utilization (e.g., acquiring more computing resources than necessary to run the codes, and thus overpaying). In accordance with embodiments of the present disclosure, the tasks established by a user may correspond to code executable to implement "map" and "reduce" functions with respect to a data set.

To enable interaction with the on-demand code execution system 110, the environment 110 includes one or more frontends 120, which enable interaction with the on-demand code execution system 110. In an illustrative embodiment, the frontends 120 serve as a "front door" to the other services provided by the on-demand code execution system 110, enabling users (via user computing devices 102) to provide, request execution of, and view results of computer executable code. The frontends 120 include a variety of components to enable interaction between the on-demand code execution system 110 and other computing devices. For example, each frontend 120 may include a request interface 122 providing user computing devices 102 with the ability to upload or otherwise communication user-specified code to the on-demand code execution system 110 and to thereafter request execution of that code. In one embodiment, the request interface 122 communicates with external computing devices (e.g., user computing devices 102, auxiliary services 106, etc.) via a graphical user interface (GUI), CLI, or API. The frontends 120 process the requests and makes sure that the requests are properly authorized. For example, the frontends 120 may determine whether the user associated with the request is authorized to access the user code specified in the request.

References to user code as used herein may refer to any program code (e.g., a program, routine, subroutine, thread, etc.) written in a specific program language. In the present disclosure, the terms "code," "user code," and "program code," may be used interchangeably. Such user code may be executed to achieve a specific function, for example, in connection with a particular web application or mobile application developed by the user. As noted above, individual collections of user code (e.g., to achieve a specific function) are referred to herein as "tasks," while specific executions of that code are referred to as "task executions" or simply "executions." Tasks may be written, by way of non-limiting example, in JavaScript (e.g., node.js), Java, Python, and/or Ruby (and/or another programming language). Tasks may be "triggered" for execution on the on-demand code execution system 110 in a variety of manners. In one embodiment, a user or other computing device may transmit a request to execute a task may, which can generally be referred to as "call" to execute of the task. Such calls may include the user code (or the location thereof) to be executed and one or more arguments to be used for executing the user code. For example, a call may provide the user code of a task along with the request to execute the task. In another example, a call may identify a previously uploaded task by its name or an identifier. In yet another example, code corresponding to a task may be included in a call for the task, as well as being uploaded in a separate location (e.g., storage of an auxiliary service 106 or a storage system internal to the on-demand code execution system 110) prior to the request being received by the on-demand code execution system 110. The on-demand code execution system 110 may vary its execution strategy for a task based on where the code of the task is available at the time a call for the task is processed. A request interface of the frontend 120 may receive calls to execute tasks as Hypertext Transfer Protocol Secure (HTTPS) requests from a user. Also, any information (e.g., headers and parameters) included in the HTTPS request may also be processed and utilized when executing a task. As discussed above, any other protocols, including, for example, HTTP, MQTT, and CoAP, may be used to transfer the message containing a task call to the request interface 122.

A call to execute a task may specify one or more third-party libraries (including native libraries) to be used along with the user code corresponding to the task. In one embodiment, the call may provide to the on-demand code execution system 110 a ZIP file containing the user code and any libraries (and/or identifications of storage locations thereof) corresponding to the task requested for execution. In some embodiments, the call includes metadata that indicates the program code of the task to be executed, the language in which the program code is written, the user associated with the call, and/or the computing resources (e.g., memory, etc.) to be reserved for executing the program code. For example, the program code of a task may be provided with the call, previously uploaded by the user, provided by the on-demand code execution system 110 (e.g., standard routines), and/or provided by third parties. In some embodiments, such resource-level constraints (e.g., how much memory is to be allocated for executing a particular user code) are specified for the particular task, and may not vary over each execution of the task. In such cases, the on-demand code execution system 110 may have access to such resource-level constraints before each individual call is received, and the individual call may not specify such resource-level constraints. In some embodiments, the call may specify other constraints such as permission data that indicates what kind of permissions or authorities that the call invokes to execute the task. Such permission data may be used by the on-demand code execution system 110 to access private resources (e.g., on a private network).

In some embodiments, a call may specify the behavior that should be adopted for handling the call. In such embodiments, the call may include an indicator for enabling one or more execution modes in which to execute the task referenced in the call. For example, the call may include a flag or a header for indicating whether the task should be executed in a debug mode in which the debugging and/or logging output that may be generated in connection with the execution of the task is provided back to the user (e.g., via a console user interface). In such an example, the on-demand code execution system 110 may inspect the call and look for the flag or the header, and if it is present, the on-demand code execution system 110 may modify the behavior (e.g., logging facilities) of the container in which the task is executed, and cause the output data to be provided back to the user. In some embodiments, the behavior/mode indicators are added to the call by the user interface provided to the user by the on-demand code execution system 110. Other features such as source code profiling, remote debugging, etc., may also be enabled or disabled based on the indication provided in a call.

To manage requests for code execution, the frontend 120 can include an execution queue (not shown in FIG. 1), which can maintain a record of requested task executions. Illustratively, the number of simultaneous task executions by the on-demand code execution system 110 is limited, and as such, new task executions initiated at the on-demand code execution system 110 (e.g., via an API call, via a call from an executed or executing task, etc.) may be placed on the execution queue 124 and processed, e.g., in a first-in-first-out order. In some embodiments, the on-demand code execution system 110 may include multiple execution queues, such as individual execution queues for each user account. For example, users of the on-demand code execution system 110 may desire to limit the rate of task executions on the on-demand code execution system 110 (e.g., for cost reasons). Thus, the on-demand code execution system 110 may utilize an account-specific execution queue to throttle the rate of simultaneous task executions by a specific user account. In some instances, the on-demand code execution system 110 may prioritize task executions, such that task executions of specific accounts or of specified priorities bypass or are prioritized within the execution queue. In other instances, the on-demand code execution system 110 may execute tasks immediately or substantially immediately after receiving a call for that task, and thus, the execution queue may be omitted.

As noted above, tasks may be triggered for execution at the on-demand code execution system 110 based on explicit calls from user computing devices 102 (e.g., as received at the request interface 122). Alternatively or additionally, tasks may be triggered for execution at the on-demand code execution system 110 based on data retrieved from one or more auxiliary services 106 or network-based data storage services 108. To facilitate interaction with auxiliary services 106, the frontend 120 can include a polling interface (not shown in FIG. 1), which operates to poll auxiliary services 106 or data storage services 108 for data. Illustratively, the polling interface may periodically transmit a request to one or more user-specified auxiliary services 106 or data storage services 108 to retrieve any newly available data (e.g., social network "posts," news articles, files, records, etc.), and to determine whether that data corresponds to a user-established criteria triggering execution a task on the on-demand code execution system 110. Illustratively, criteria for execution of a task may include, but is not limited to, whether new data is available at the auxiliary services 106 or data storage services 108, the type or content of the data, or timing information corresponding to the data. In some instances, the auxiliary services 106 or data storage services 108 may function to notify the frontend 120 of the availability of new data, and thus the polling service may be unnecessary with respect to such services.

In addition to tasks executed based on explicit user calls and data from auxiliary services 106, the on-demand code execution system 110 may in some instances operate to trigger execution of tasks independently. For example, the on-demand code execution system 110 may operate (based on instructions from a user) to trigger execution of a task at each of a number of specified time intervals (e.g., every 10 minutes).

The frontend 120 can further includes an output interface (not shown in FIG. 1) configured to output information regarding the execution of tasks on the on-demand code execution system 110. Illustratively, the output interface may transmit data regarding task executions (e.g., results of a task, errors related to the task execution, or details of the task execution, such as total time required to complete the execution, total data processed via the execution, etc.) to the user computing devices 102 or to auxiliary services 106, which may include, for example, billing or logging services. The output interface may further enable transmission of data, such as service calls, to auxiliary services 106. For example, the output interface may be utilized during execution of a task to transmit an API request to an external service 106 (e.g., to store data generated during execution of the task).

As shown in FIG. 1, in some embodiments, the on-demand code execution system 110 may include multiple frontends 120. In such embodiments, a load balancer (not shown in FIG. 1) may be provided to distribute the incoming calls to the multiple frontends 120, for example, in a round-robin fashion. In some embodiments, the manner in which the load balancer distributes incoming calls to the multiple frontends 120 may be based on the location or state of other components of the on-demand code execution system 110. For example, a load balancer may distribute calls to a geographically nearby frontend 120, or to a frontend with capacity to service the call. In instances where each frontend 120 corresponds to an individual instance of another component of the on-demand code execution system, such as the warming pools 130A or active pools 140A described below, the load balancer may distribute calls according to the capacities or loads on those other components. As will be described in more detail below, calls may in some instances be distributed between frontends 120 deterministically, such that a given call to execute a task will always (or almost always) be routed to the same frontend 120. This may, for example, assist in maintaining an accurate execution record for a task, to ensure that the task executes only a desired number of times. While distribution of calls via a load balancer is illustratively described, other distribution techniques, such as anycast routing, will be apparent to those of skill in the art.

To execute tasks, the on-demand code execution system 110 includes one or more warming pool managers 130, which "pre-warm" (e.g., initialize) virtual machine instances to enable tasks to be executed quickly, without the delay caused by initialization of the virtual machines. The on-demand code execution system 110 further includes one or more worker managers 140, which manage active virtual machine instances (e.g., currently assigned to execute tasks in response to task calls).

The warming pool managers 130 ensure that virtual machine instances are ready to be used by the worker managers 140 when the on-demand code execution system 110 detects an event triggering execution of a task on the on-demand code execution system 110. In the example illustrated in FIG. 1, each warming pool manager 130 manages a corresponding warming pool 130A, which is a group (sometimes referred to as a pool) of pre-initialized and pre-configured virtual machine instances that may be used to execute tasks in response to triggering of those tasks. In some embodiments, the warming pool managers 130 cause virtual machine instances to be booted up on one or more physical computing machines within the on-demand code execution system 110 and added to a corresponding warming pool 130A. For example, each warming pool manager 130 may cause additional instances to be added to the corresponding warming pool 130A based on the available capacity in the corresponding warming pool 130A to service incoming calls. As will be described below, the warming pool managers 130 may further work in conjunction with other components of the on-demand code execution system 110, such as the worker managers 140, to add or otherwise manage instances and/or containers in the warming pools 130A based on received pre-trigger notifications. In some embodiments, the warming pool managers 130 may use both physical computing devices within the on-demand code execution system 110 and one or more virtual machine instance services to acquire and maintain compute capacity that can be used to service calls received by the frontends 120. Further, the on-demand code execution system 110 may comprise one or more logical knobs or switches for controlling (e.g., increasing or decreasing) the available capacity in the warming pools 130A. For example, a system administrator may use such a knob or switch to increase the capacity available (e.g., the number of pre-booted instances) in the warming pools 130A during peak hours. In some embodiments, virtual machine instances in the warming pools 130A can be configured based on a predetermined set of configurations independent from a specific call to execute a task. The predetermined set of configurations can correspond to various types of virtual machine instances to execute tasks. The warming pool managers 130 can optimize types and numbers of virtual machine instances in the warming pools 130A based on one or more metrics related to current or previous task executions. Further, the warming pool managers 130 can establish or modify the types and number of virtual machine instances in the warming pools 130A based on pre-trigger notifications (e.g., by pre-initializing one or more virtual machine instances based on requirements of a task expected to be executed based on a received pre-trigger notification).

As shown in FIG. 1, instances may have operating systems (OS) and/or language runtimes loaded thereon. For example, the warming pool 130A managed by a warming pool manager 130 can comprise instances 152, 154. The instance 152 includes an OS 152A and a runtime 152B. The instance 154 includes an OS 154A. In some embodiments, the instances in the warming pool 130A may also include containers (which may further contain copies of operating systems, runtimes, user codes, etc.), which are described in greater detail below. Although the instance 152 is shown in FIG. 1 to include a single runtime, in other embodiments, the instances depicted in FIG. 1 may include two or more runtimes, each of which may be used for running a different user code. In some embodiments, the warming pool managers 130 may maintain a list of instances in a corresponding warming pool 130A. The list of instances may further specify the configuration (e.g., OS, runtime, container, etc.) of the instances.

In some embodiments, the virtual machine instances in a warming pool 130A may be used to serve any user's calls. In one embodiment, all the virtual machine instances in a warming pool 130A are configured in the same or substantially similar manner. In another embodiment, the virtual machine instances in a warming pool 130A may be configured differently to suit the needs of different users. For example, the virtual machine instances may have different operating systems, different language runtimes, and/or different libraries loaded thereon. In yet another embodiment, the virtual machine instances in a warming pool 130A may be configured in the same or substantially similar manner (e.g., with the same OS, language runtimes, and/or libraries), but some of those instances may have different container configurations. For example, one instance might have a container created therein for running code written in Python, and another instance might have a container created therein for running code written in Ruby.

The warming pool managers 130 may pre-configure the virtual machine instances in a warming pool 130A, such that each virtual machine instance is configured to satisfy at least one of the operating conditions that may be requested or specified by a user when defining a task. In one embodiment, the operating conditions may include program languages in which the potential user code of a task may be written. For example, such languages may include Java, JavaScript, Python, Ruby, and the like. In some embodiments, the set of languages that the user code of a task may be written in may be limited to a predetermined set (e.g., set of 4 languages, although in some embodiments sets of more or less than four languages are provided) in order to facilitate pre-initialization of the virtual machine instances that can satisfy calls to execute the task. For example, when the user is configuring a task via a user interface provided by the on-demand code execution system 110, the user interface may prompt the user to specify one of the predetermined operating conditions for executing the task. In another example, the service-level agreement (SLA) for utilizing the services provided by the on-demand code execution system 110 may specify a set of conditions (e.g., programming languages, computing resources, etc.) that tasks should satisfy, and the on-demand code execution system 110 may assume that the tasks satisfy the set of conditions in handling the requests. In another example, operating conditions specified by a task may include: the amount of compute power to be used for executing the task; the type of triggering event for a task (e.g., an API call, HTTP packet transmission, detection of a specific data at an auxiliary service 106); the timeout for the task (e.g., threshold time after which an execution of the task may be terminated); and security policies (e.g., may control which instances in the warming pools 130A are usable by which user), among other specified conditions.

One or more worker managers 140 manage the instances used for servicing incoming calls to execute tasks. In the example illustrated in FIG. 1, each worker managers 140 manages an active pool 140A, which is a group (sometimes referred to as a pool) of virtual machine instances, implemented by one or more physical host computing devices, that are currently assigned to one or more users. Although the virtual machine instances are described here as being assigned to a particular user, in some embodiments, the instances may be assigned to a group of users, such that the instance is tied to the group of users and any member of the group can utilize resources on the instance. For example, the users in the same group may belong to the same security group (e.g., based on their security credentials) such that executing one member's task in a container on a particular instance after another member's task has been executed in another container on the same instance does not pose security risks. Similarly, the worker managers 140 may assign the instances and the containers according to one or more policies that dictate which requests can be executed in which containers and which instances can be assigned to which users. An example policy may specify that instances are assigned to collections of users who share the same account (e.g., account for accessing the services provided by the on-demand code execution system 110). In some embodiments, the requests associated with the same user group may share the same containers (e.g., if the user codes associated therewith are identical). In some embodiments, a task does not differentiate between the different users of the group and simply indicates the group to which the users associated with the task belong.

As shown in FIG. 1, instances may have operating systems (OS), language runtimes, and containers. The containers may have individual copies of the OS, the runtimes, and user codes corresponding to various tasks loaded thereon. In the example of FIG. 1, the active pools 140A managed by a worker manager 140 includes the instances 156, 158. The instance 156 has an OS 156A, runtimes 156B, 156C, and containers 156D, 156E. The container 156D includes a copy of the OS 156A, a copy of the runtime 156B, and a copy of a code 156D-1. The container 156E includes a copy of the OS 156A, a copy of the runtime 156C, and a copy of a code 156E-1. The instance 158 has an OS 158A, runtimes 158B, 158C, 158E, 158F, a container 158D, and codes 158G, 158H. The container 158D has a copy of the OS 158A, a copy of the runtime 158B, and a copy of a code 158D-1. As illustrated in FIG. 1, instances may have user codes loaded thereon, and containers within those instances may also have user codes loaded therein. In some embodiments, the worker managers 140 may maintain a list of instances in an active pool 140A. The list of instances may further specify the configuration (e.g., OS, runtime, container, etc.) of the instances. In some embodiments, the worker managers 140 may have access to a list of instances in a warming pool 130A (e.g., including the number and type of instances). In other embodiments, the worker managers 140 requests compute capacity from a warming pool manager 130 without having knowledge of the virtual machine instances in a warming pool 130A.

In the example illustrated in FIG. 1, tasks are executed in isolated execution environments referred to as containers (e.g., containers 156D, 156E, 158D). Containers are logical units created within a virtual machine instance using the resources available on that instance. For example, each worker manager 140 may, based on information specified in a call to execute a task, create a new container, or locate an existing container in one of the instances in an active pool 140A and assigns the container to the call to handle the execution of the task. In one embodiment, such containers are implemented as Linux containers.

Once a triggering event to execute a task has been successfully processed by a frontend 120, the frontend 120 passes a request to a worker manager 140 to execute the task. In one embodiment, each frontend 120 may be associated with a corresponding worker manager 140 (e.g., a worker manager 140 co-located or geographically nearby to the frontend 120) and thus, the frontend 120 may pass most or all requests to that worker manager 140. In another embodiment, a frontend 120 may include a location selector 126 configured to determine a worker manager 140 to which to pass the execution request. Illustratively, to assist in implementation of execution guarantees, the location selector 126 to select the same worker manager 140 to receive each call to a task to the same worker manager 140, such that the worker manager 140 can maintain an authoritative execution record for the task. In one embodiment, the location selector 126 may determine the worker manager 140 to receive a call based on hashing the call, and distributing the call to a worker manager 140 selected based on the hashed value (e.g., via a hash ring). Various other mechanisms for distributing calls between worker managers 140 will be apparent to one of skill in the art.

On receiving a request to execute a task, a worker manager 140 finds capacity to execute a task on the on-demand code execution system 110. For example, if there exists a particular virtual machine instance in the active pool 140A that has a container with the user code of the task already loaded therein (e.g., code 156D-1 shown in the container 156D), the worker manager 140 may assign the container to the task and cause the task to be executed in the container. Alternatively, if the user code of the task is available in the local cache of one of the virtual machine instances (e.g., codes 158G, 158H, which are stored on the instance 158 but do not belong to any individual containers), the worker manager 140 may create a new container on such an instance, assign the container to the task, and cause the user code of the task to be loaded and executed in the container.

If the worker manager 140 determines that the user code associated with the triggered task is not found on any of the instances (e.g., either in a container or the local cache of an instance) in the active pool 140A, the worker manager 140 may determine whether any of the instances in the active pool 140A is currently assigned to the user associated with the triggered task and has compute capacity to handle the triggered task. If there is such an instance, the worker manager 140 may create a new container on the instance and assign the container to execute the triggered task. Alternatively, the worker manager 140 may further configure an existing container on the instance assigned to the user, and assign the container to the triggered task. For example, the worker manager 140 may determine that the existing container may be used to execute the task if a particular library demanded by the task is loaded thereon. In such a case, the worker manager 140 may load the particular library and the code of the task onto the container and use the container to execute the task.

If the active pool 140 does not contain any instances currently assigned to the user, the worker manager 140 pulls a new virtual machine instance from the warming pool 130A, assigns the instance to the user associated with the triggered task, creates a new container on the instance, assigns the container to the triggered task, and causes the user code of the task to be downloaded and executed on the container.

In some embodiments, the on-demand code execution system 110 is adapted to begin execution of a task shortly after it is received (e.g., by the frontend 120). A time period can be determined as the difference in time between initiating execution of the task (e.g., in a container on a virtual machine instance associated with the user) and detecting an event that triggers execution of the task (e.g., a call received by the frontend 120). The on-demand code execution system 110 is adapted to begin execution of a task within a time period that is less than a predetermined duration. In one embodiment, the predetermined duration is 500 ms. In another embodiment, the predetermined duration is 300 ms. In another embodiment, the predetermined duration is 100 ms. In another embodiment, the predetermined duration is 50 ms. In another embodiment, the predetermined duration is 10 ms. In another embodiment, the predetermined duration may be any value chosen from the range of 10 ms to 500 ms. In some embodiments, the on-demand code execution system 110 is adapted to begin execution of a task within a time period that is less than a predetermined duration if one or more conditions are satisfied. For example, the one or more conditions may include any one of: (1) the user code of the task is loaded on a container in the active pool 140 at the time the request is received; (2) the user code of the task is stored in the code cache of an instance in the active pool 140 at the time the call to the task is received; (3) the active pool 140A contains an instance assigned to the user associated with the call at the time the call is received; or (4) the warming pool 130A has capacity to handle the task at the time the event triggering execution of the task is detected.

Once the worker manager 140 locates one of the virtual machine instances in the warming pool 130A that can be used to execute a task, the warming pool manager 130 or the worker manger 140 takes the instance out of the warming pool 130A and assigns it to the user associated with the request. The assigned virtual machine instance is taken out of the warming pool 130A and placed in the active pool 140A. In some embodiments, once the virtual machine instance has been assigned to a particular user, the same virtual machine instance cannot be used to execute tasks of any other user. This provides security benefits to users by preventing possible co-mingling of user resources. Alternatively, in some embodiments, multiple containers belonging to different users (or assigned to requests associated with different users) may co-exist on a single virtual machine instance. Such an approach may improve utilization of the available compute capacity.

In some embodiments, the on-demand code execution system 110 may maintain a separate cache in which code of tasks are stored to serve as an intermediate level of caching system between the local cache of the virtual machine instances and the account data store 164 (or other network-based storage not shown in FIG. 1). The various scenarios that the worker manager 140 may encounter in servicing the call are described in greater detail within the '556 Patent, incorporated by reference above (e.g., at FIG. 4 of the '556 Patent).

After the task has been executed, the worker manager 140 may tear down the container used to execute the task to free up the resources it occupied to be used for other containers in the instance. Alternatively, the worker manager 140 may keep the container running to use it to service additional calls from the same user. For example, if another call associated with the same task that has already been loaded in the container, the call can be assigned to the same container, thereby eliminating the delay associated with creating a new container and loading the code of the task in the container. In some embodiments, the worker manager 140 may tear down the instance in which the container used to execute the task was created. Alternatively, the worker manager 140 may keep the instance running to use it to service additional calls from the same user. The determination of whether to keep the container and/or the instance running after the task is done executing may be based on a threshold time, the type of the user, average task execution volume of the user, and/or other operating conditions. For example, after a threshold time has passed (e.g., 5 minutes, 30 minutes, 1 hour, 24 hours, 30 days, etc.) without any activity (e.g., task execution), the container and/or the virtual machine instance is shutdown (e.g., deleted, terminated, etc.), and resources allocated thereto are released. In some embodiments, the threshold time passed before a container is torn down is shorter than the threshold time passed before an instance is torn down.

In some embodiments, the on-demand code execution system 110 may provide data to one or more of the auxiliary services 106 as it executes tasks in response to triggering events. For example, the frontends 120 may communicate with the monitoring/logging/billing services included within the auxiliary services 106. The monitoring/logging/billing services may include: a monitoring service for managing monitoring information received from the on-demand code execution system 110, such as statuses of containers and instances on the on-demand code execution system 110; a logging service for managing logging information received from the on-demand code execution system 110, such as activities performed by containers and instances on the on-demand code execution system 110; and a billing service for generating billing information associated with executing user code on the on-demand code execution system 110 (e.g., based on the monitoring information and/or the logging information managed by the monitoring service and the logging service). In addition to the system-level activities that may be performed by the monitoring/logging/billing services (e.g., on behalf of the on-demand code execution system 110), the monitoring/logging/billing services may provide application-level services on behalf of the tasks executed on the on-demand code execution system 110. For example, the monitoring/logging/billing services may monitor and/or log various inputs, outputs, or other data and parameters on behalf of the tasks being executed on the on-demand code execution system 110.

In some embodiments, the worker managers 140 may perform health checks on the instances and containers managed by the worker managers 140 (e.g., those in a corresponding active pool 140A). For example, the health checks performed by a worker manager 140 may include determining whether the instances and the containers managed by the worker manager 140 have any issues of (1) misconfigured networking and/or startup configuration, (2) exhausted memory, (3) corrupted file system, (4) incompatible kernel, and/or any other problems that may impair the performance of the instances and the containers. In one embodiment, a worker manager 140 performs the health checks periodically (e.g., every 5 minutes, every 30 minutes, every hour, every 24 hours, etc.). In some embodiments, the frequency of the health checks may be adjusted automatically based on the result of the health checks. In other embodiments, the frequency of the health checks may be adjusted based on user requests. In some embodiments, a worker manager 140 may perform similar health checks on the instances and/or containers in a warming pool 130A. The instances and/or the containers in a warming pool 130A may be managed either together with those instances and containers in an active pool 140A or separately. In some embodiments, in the case where the health of the instances and/or the containers in a warming pool 130A is managed separately from an active pool 140A, a warming pool manager 130, instead of a worker manager 140, may perform the health checks described above on the instances and/or the containers in a warming pool 130A.

In the depicted example, virtual machine instances ("instances") 152, 154 are shown in a warming pool 130A managed by a warming pool manager 130, and instances 156, 158 are shown in an active pool 140A managed by a worker manager 140. The illustration of the various components within the on-demand code execution system 110 is logical in nature and one or more of the components can be implemented by a single computing device or multiple computing devices. For example, the instances 152, 154, 156, 158 can be implemented on one or more physical computing devices in different various geographic regions. Similarly, each frontend 120, warming pool manager 130, and worker manager 140 can be implemented across multiple physical computing devices. Alternatively, one or more of a frontend 120, a warming pool manager 130, and a worker manager 140 can be implemented on a single physical computing device. Although four virtual machine instances are shown in the example of FIG. 1, the embodiments described herein are not limited as such, and one skilled in the art will appreciate that the on-demand code execution system 110 may comprise any number of virtual machine instances implemented using any number of physical computing devices. Similarly, although multiple warming pools 130A and active pools 140A are shown in the example of FIG. 1, the embodiments described herein are not limited as such, and one skilled in the art will appreciate that the on-demand code execution system 110 may comprise any number of warming pools and active pools.

In accordance with embodiments of the present disclosure, the on-demand code execution system 110 may operate to enable serialization of code, such that the code is implemented across multiple, duration-limited code executions. In one embodiment, the on-demand code execution system 110 may enable users to serialize data processing tasks. Illustratively, the on-demand code execution system 110 may enable a user to provide user-defined code to the on-demand code execution system 110 that specifies processing to be completed against an input data file (e.g., a checksum calculation or video encoding), an amount of data to be processed within an individual task execution, state information to be passed from a present task execution to a subsequent task execution, and a function to utilize state information from a past execution to initialize a current task execution. Thereafter, the on-demand code execution system 110 may response to a request to execute the code against a target data file by implementing serialized processing of the input data file. Specifically, the on-demand code execution system 110 may initiate (e.g., via the worker manager 140) a first execution of the user-defined code to process a first amount of data and to call a second execution of the user-defined code, initiate a second execution of the user-defined code to process a second amount of data and to call a third execution of the user-defined code, etc., until the target data is processed.

In another embodiment, the on-demand code execution system 110 may enable users to serialize any number of iterative processes within user-defined code. Specifically, the on-demand code execution system 110 may enable users to specify serialization points within an iterative processes, a serialization function to be called at the serialization point in the instance that a duration limit of a task execution is near, and a construction function to be called during a subsequent execution to initialize a state of the subsequent execution based on state information of a prior execution. Thereafter, when the on-demand code execution system 110 executes the user-defined code (e.g., in response to a request from a user), the on-demand code execution system 110 may check, at each occurrence of the serialization point, whether a current task execution is approaching a duration limit. If so, the on-demand code execution system 110 may call the serialization function to encode a current state of the task execution, transmit a call (e.g., to the frontend 120) to initiate another execution of the task, and halt the current execution of the task. Prior to resuming the iterative process within the task, the on-demand code execution system 110 may call the deserialization function within the task to initialize the iterative function based on state information within the call (e.g., as generated during a prior execution). The on-demand code execution system 110 may continue to monitor for an approaching duration limit at each serialization point, and continue to generate additional code executions, until the iterative process is complete. Thus, users may be enabled to implement iterative processes of unbounded length on the on-demand code execution system 110 even given duration restrictions for individual task executions.

While some functionalities are generally described herein with reference to an individual component of the on-demand code execution system 110, other components or a combination of components may additionally or alternatively implement such functionalities. For example, while a worker manager 140 may operate to record the state of executions for a given execution identifier, a frontend 140 or virtual machine instance may additionally or alternatively record such state information.

Figure 2:
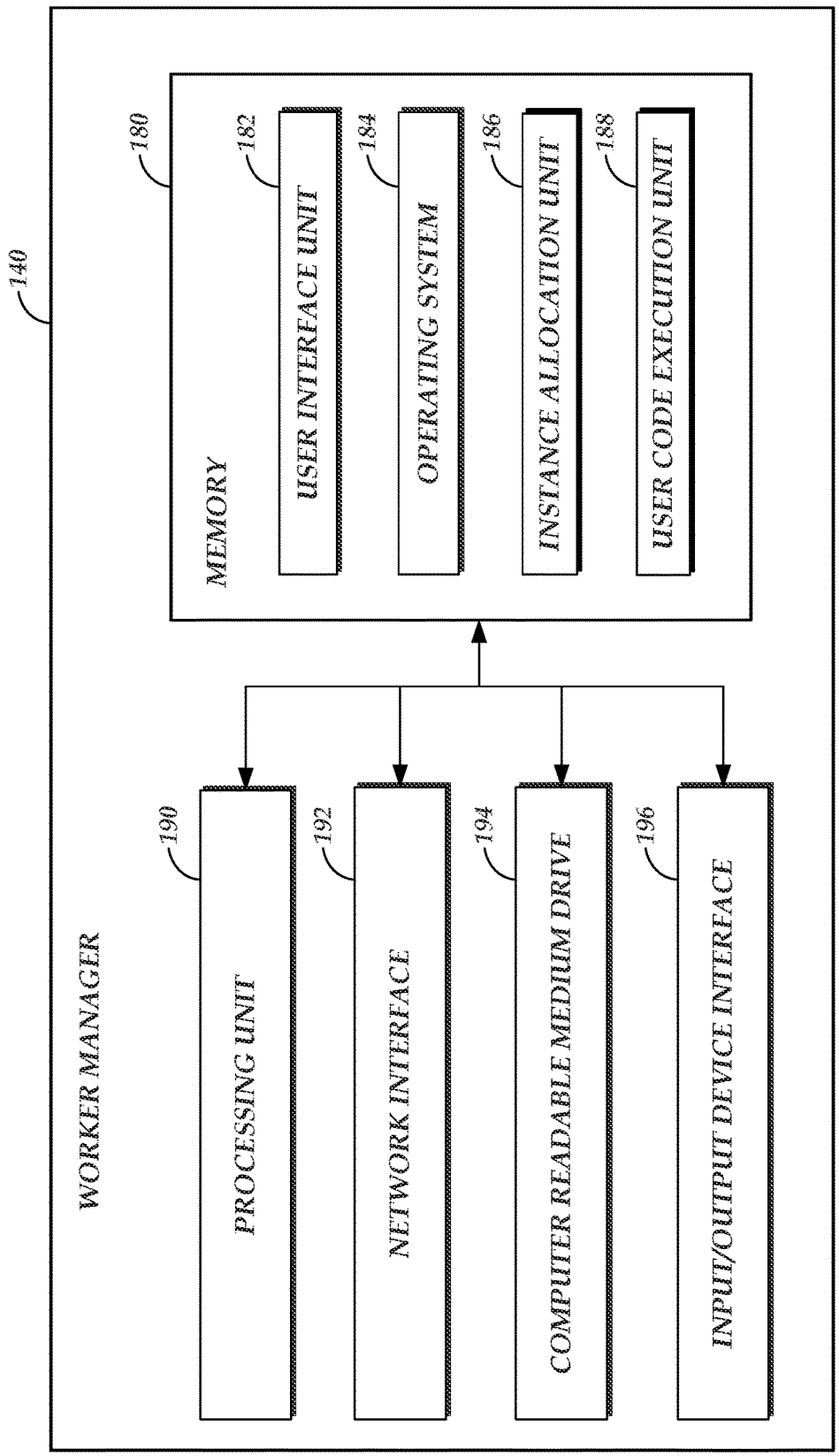
FIG. 2 depicts a general architecture of a computing device providing a worker manager that is configured to facilitate serializing execution of code across multiple, duration-limited task executions on the on-demand code execution system of FIG. 1.

FIG. 2 depicts a general architecture of a computing system (referenced as worker manager 140) that manages the virtual machine instances in the on-demand code execution system 110. The general architecture of the worker manager 140 depicted in FIG. 2 includes an arrangement of computer hardware and software modules that may be used to implement aspects of the present disclosure. The hardware modules may be implemented with physical electronic devices, as discussed in greater detail below. The worker manager 140 may include many more (or fewer) elements than those shown in FIG. 2. It is not necessary, however, that all of these generally conventional elements be shown in order to provide an enabling disclosure. Additionally, the general architecture illustrated in FIG. 2 may be used to implement one or more of the other components illustrated in FIG. 1. As illustrated, the worker manager 140 includes a processing unit 190, a network interface 192, a computer readable medium drive 194, and an input/output device interface 196, all of which may communicate with one another by way of a communication bus. The network interface 192 may provide connectivity to one or more networks or computing systems. The processing unit 190 may thus receive information and instructions from other computing systems or services via the network 104. The processing unit 190 may also communicate to and from memory 180 and further provide output information for an optional display (not shown) via the input/output device interface 196. The input/output device interface 196 may also accept input from an optional input device (not shown).

The memory 180 may contain computer program instructions (grouped as modules in some embodiments) that the processing unit 190 executes in order to implement one or more aspects of the present disclosure. The memory 180 generally includes random access memory (RAM), read only memory (ROM) and/or other persistent, auxiliary, or non-transitory computer readable media. The memory 180 may store an operating system 184 that provides computer program instructions for use by the processing unit 190 in the general administration and operation of the worker manager 140. The memory 180 may further include computer program instructions and other information for implementing aspects of the present disclosure. For example, in one embodiment, the memory 180 includes a user interface unit 182 that generates user interfaces (and/or instructions therefor) for display upon a computing device, e.g., via a navigation and/or browsing interface such as a browser or application installed on the computing device. In addition, the memory 180 may include and/or communicate with one or more data repositories (not shown), for example, to access user program codes and/or libraries.

In addition to and/or in combination with the user interface unit 182, the memory 180 may include an instance allocation unit 186 and a user code execution unit 188 that may be executed by the processing unit 190. In one embodiment, the user interface unit 182, instance allocation unit 186, and user code execution unit 188 individually or collectively implement various aspects of the present disclosure, e.g., finding compute capacity (e.g., a container) to be used for executing user code, causing the user code to be loaded and executed on the container, etc. as described further below.

The instance allocation unit 186 finds the compute capacity to be used for servicing a request to execute user code. For example, the instance allocation unit 186 identifies a virtual machine instance and/or a container that satisfies any constraints specified by the request and assigns the identified virtual machine instance and/or container to the user or the request itself. The instance allocation unit 186 may perform such identification based on the programming language in which the user code is written. For example, if the user code is written in Python, and the instance allocation unit 186 may find an virtual machine instance (e.g., in the warming pool 130A of FIG. 1) having the Python runtime pre-loaded thereon and assign the virtual machine instance to the user. In another example, if the program code specified in the request of the user is already loaded on an existing container or on another virtual machine instance assigned to the user (e.g., in the active pool 140A of FIG. 1), the instance allocation unit 186 may cause the request to be processed in the container or in a new container on the virtual machine instance. In some embodiments, if the virtual machine instance has multiple language runtimes loaded thereon, the instance allocation unit 186 may create a new container on the virtual machine instance and load the appropriate language runtime on the container based on the computing constraints specified in the request.

The user code execution unit 188 manages the execution of the program code specified by the request of the user once a particular virtual machine instance has been assigned to the user associated with the request and a container on the particular virtual machine instance has been assigned to the request. If the code is pre-loaded in a container on the virtual machine instance assigned to the user, the code is simply executed in the container. If the code is available via a network storage (e.g., storage service 108 of FIG. 1), the user code execution unit 188 downloads the code into a container on the virtual machine instance and causes the code to be executed (e.g., by communicating with the frontend 120 of FIG. 1) once it has been downloaded.

While the instance allocation unit 186 and the user code execution unit 188 are shown in FIG. 2 as part of the worker manager 140, in other embodiments, all or a portion of the instance allocation unit 186 and the user code execution unit 188 may be implemented by other components of the on-demand code execution system 110 and/or another computing device. For example, in certain embodiments of the present disclosure, another computing device in communication with the on-demand code execution system 110 may include several modules or components that operate similarly to the modules and components illustrated as part of the worker manager 140.

In some embodiments, the worker manager 140 may further include components other than those illustrated in FIG. 2. For example, the memory 180 may further include a container manager for managing creation, preparation, and configuration of containers within virtual machine instances.

Figure 3B:
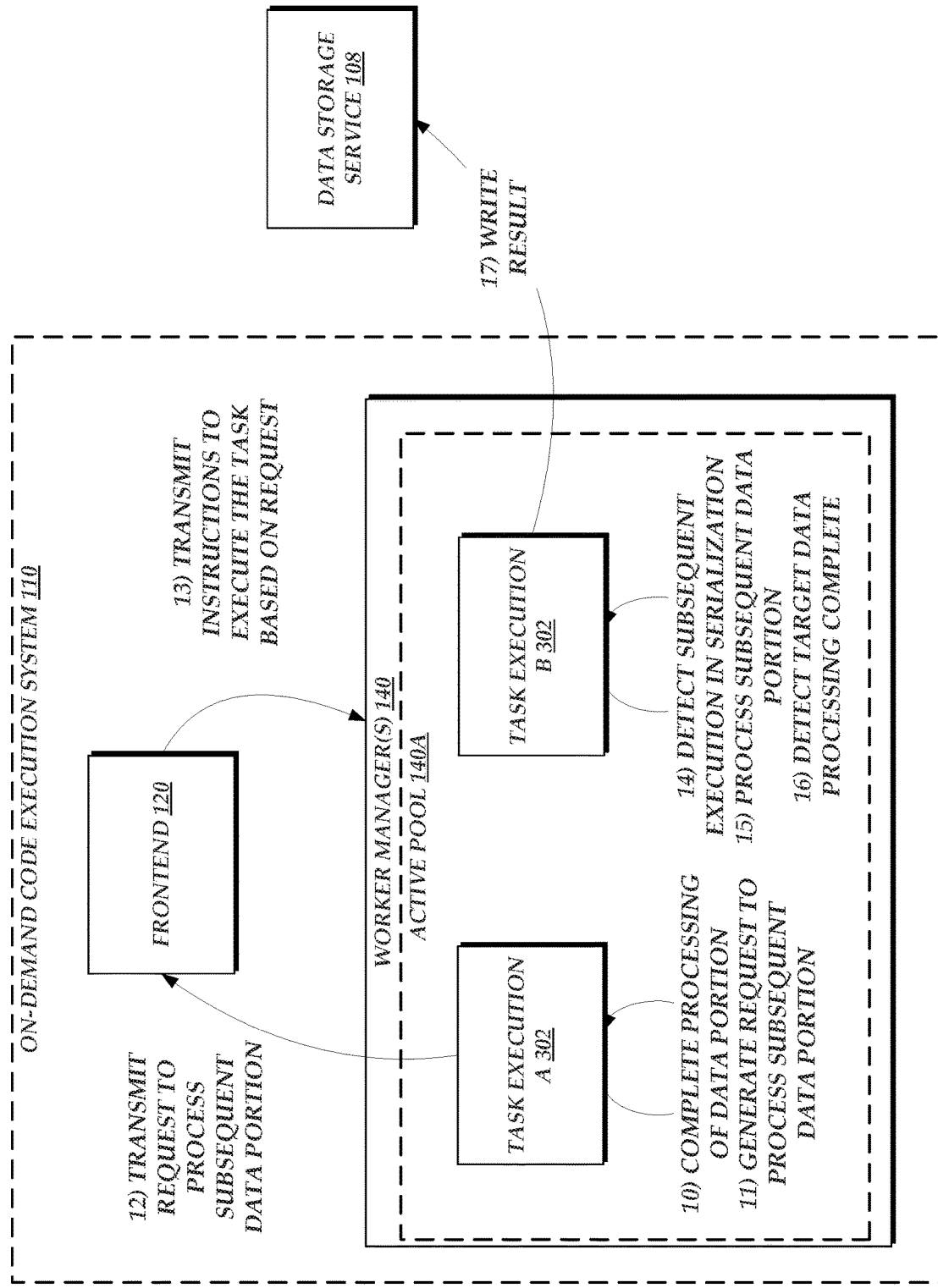

With reference to FIGS. 3A and 3B, illustrative interactions are depicted for serializing processing of a data set across multiple duration-limited task executions on the on-demand code execution system 110. Specifically, FIG. 3A depicts interactions enabling a user device 102 to submit user-defined serializable data processing code to the on-demand code execution system 110 to generate a task for processing a data set, and to request that the on-demand code execution system 110 begin an initial execution of that task with respect to a target data set (e.g., a target file). FIG. 3B depicts interactions of the first an on-demand code execution system 110 in which a first execution of the task completes processing of a first portion of the target data set, and requests a second execution of the task to process an additional portion of the target data set. The interactions of FIG. 3B further depict the second execution of the task detecting that the processing of the target data is complete, and writing a result of that processing to a data storage service 108. Illustratively, the interactions of FIGS. 3A and 3B may reflect serialized processing of a target file according to a hashing algorithm (e.g., the MD5 algorithm) to generate a checksum for the file.

The interactions referenced above begin at (1) of FIG. 3A, where a user device generates serializable data processing code. As discussed above, the code may generally implement a desired data processing (e.g., the MD5 hash algorithm), but may be modified to conduct the processing over only a fixed portion of a data set. The fixed portion may be set, for example, based on an expected amount of data that a task execution on the on-demand code execution system 110 may process prior to expiration of a duration limit on the task execution. In this regard, the fixed portion may be dependent on a number of factors, such as the specific data processing in question, a communication speed between the on-demand code execution system 110 and a data source, and a processing speed of the task execution on the on-demand code execution system 110. In one embodiment, the fixed portion may be experimentally determined, for example, by attempting to initiate a task execution to process a large data set according to the desired processing, and monitoring an amount of the data set processed prior to the task execution exceeding a duration limit of the on-demand code execution system 110 (e.g., such that the fixed portion may be set below the data set processed prior to the duration limit being exceed). In one embodiment, the code may further be modified such that a first execution of a task corresponding to the code determines a segmentation of the file, according to the fixed portions. For example, a first execution of the task may partition the target data set into portions of the desired size, such that each execution n processes the nth portion of the target data set, until the complete data set has been processed. Moreover, the code may be modified such that after processing a given portion of the target data set, a state of an execution can be generated and passed within a call to an additional execution, and such that the additional execution can resume processing of the target data set based on the state data (e.g., by initiating processing of a next portion as indicated by the state data).

In one embodiment, the serializable data processing code is generated wholly by a user of the user device 102. In another embodiment, the serializable data processing code is generated by a user of the user device 102 based on a template or portion of code provided by the on-demand code execution system 110 (e.g., via a library provided by the on-demand code execution system 110). For example, the on-demand code execution system 110 may in one instance provide a serialized processing function within a library file, which function receives as arguments a target data file, a data processing function, a "serialization" function that operates to save a state of the data processing function after processing a portion of data, and a "deserialization" function that operates to initialize the data processing function based on state information generated by the serialization function. In some instances, the serialized processing function may also take as an argument a length of a fixed portion to be processed by the data processing function. In other instances, the on-demand code execution system 110 may programmatically determine this length (e.g., via attempting to process all or a large portion of a target data set and monitoring an amount of data processed before a duration length is exceeded, as discussed above), and thus, a user may not be required to specify the length of the fixed portion. Thus, by defining the data processing, serialization, and deserialization functions, a user may be enabled to generate the serializable data processing code. (The user may not be required to define the target data file at the time of generating the serializable data processing code, as that target data file may be passed as an argument when calling for execution of a task corresponding to the serializable data processing code.)

Thereafter, at (2), the user device 102 submits the serializable data processing code to the frontend 120 as a task on the on-demand code execution system 110. Concurrently or at a later time, the user device 102 may also, at (3), transmit to the frontend 120 a request for execution of the task with respect to target data. Target data may represent, for example, a file located on data storage service 108, an identifier or location of which may be specified within the request to execute the task. While the request to execute the task is illustratively shown as transmitted by the user device 102, task executions may be triggered according to any number of criteria, as discussed above.

At (4), the frontend 120 transmits instructions to the worker manager 140 to execute the serializable data processing code as a task within a device of the active pool 140A. At (5), the worker manager 140 initiates an execution of the code as a task within the active pool 140A. That task execution is shown as task execution A 302 within FIG. 3A.

As noted in the '556 Patent, the frontend 120 may undertake various functionalities prior to transmitting the instructions to the worker manager 140, such as queuing the requested execution, identifying the worker manager 140 to receive the instructions, etc. Similarly, the worker manager 140 may undertake various functionalities prior to or as part of initiating a task execution, such as selecting or generating an execution environment for the task. These functionalities are excluded for brevity, but are discussed in more detail within the '556 Patent, incorporated by reference above. Thus, one skilled in the art will appreciate that the interactions of FIGS. 3A and 3B have been simplified for ease of description.

At (5), the task execution A 302 determines that this execution corresponds to an initial task execution for processing the target data. Illustratively, this determination may be based on the format of the instructions to execute the task (e.g., because the instructions exclude state information of a prior task execution for the target data). As such, the task execution A 302 may determine that the target data should be partitioned into portions of a fixed length, as specified within the serializable data processing code. The task execution A 302 therefore transmits, at (6), a request to the data storage service 108 for metadata regarding the target data. That metadata can include, for example, a size of the target data. The metadata is returned to the task execution A 302 at (7). From the metadata, the task execution A 302, at (8), partitions the target data into portions of the fixed length. Thereafter, at (9), the task execution A 302 processes an initial portion of the target data, according to the processing specified within the serializable data processing code. For example, the task execution A 302 may process the initial portion according to the MD5 hash algorithm. Processing the portion may include, for example, retrieving the portion from the data storage service 108. Because the specific processing of data may vary across embodiments of the present disclosure, such processing (and the set of interactions required for such processing) is not discussed in detail herein.

The interactions of FIG. 3A are continued with reference to FIG. 3B. As shown in FIG. 3B, the task execution A 302, at (10), completes processing of the initial portion of the target data. As discussed above, a size of the initial portion may be selected to ensure that such processing is completed prior the task execution A 302 exceeding a duration limit for task executions on the on-demand code execution system 110. However, because processing has not completed with respect to an entirety of the target data, the task execution A 302, at (11), generates a request to the on-demand code execution system 110 to initiate a second execution o of the task, to process a second portion of the target data. Illustratively, the task execution A 302 may generate the request by calling a serialization function defined within the serializable data processing code corresponding to the task, which function generates state information regarding a state of the task execution A 302. In one embodiment, the state information may be in JAVASCRIPT™ object notation (JSON) format. For example, where the task execution A 302 is configured to generate a checksum of a target data according to the MD5 hash algorithm, the state information may include a determined portioning of the target data (e.g., alignment of a number of portions of fixed length within an overall structure of target data), a portion of the target data processed by the task execution A 302, and any "leftover" bits within the portion that have not yet been accounted for within the MD5 hash algorithm (e.g., a remainder of the portion that is less than 512 bits, and thus cannot be processed by the task execution A 302 in accordance with the MD5 hash algorithm).

At (12), the request generated by the task execution A 302 is transmitted to the frontend 120. The task execution A 302 may thereafter end, such that the task execution A 302 does not exceed a duration limit for task executions on the on-demand code execution system 110.

The frontend 120 then, at (13), transmits an instructions to execute the task corresponding to the serializable data processing code based on the request. The instructions may include, for example, state information included within the request, as generated by the task execution A 302. While the request is illustrated as passing through the frontend 120, in some embodiments a task execution 302 may be configured to communicate directly with a worker manager 140 to initiate execution of a task, and thus communication with the frontend 120 may be unnecessary.

In response to the instructions, the worker manager 140 initiates an additional task execution, depicted as task execution B 302. As noted above, the worker manager 140 may implement various functionalities prior to or as part of initiating a task execution, such as selecting or generating an execution environment for the task. These functionalities are excluded for brevity, but are discussed in more detail within the '556 Patent, incorporated by reference above. In the context of the present application, because task execution B 302 is an additional execution of a task previously executed by the worker manager 140 (task execution A 302), the worker manager 140 may, for example, initiate the task execution B 302 within an execution environment already used by the task execution A 302. Thus, the worker manager 140 may not be required to generate a new execution environment for the task execution B 302.

At (14), the task execution B 302 detects that it is an additional task execution for processing the target data. This detection may be based, for example, on identification of state information of a prior task execution within the instructions to initiate the task execution B 302, which may be passed to the task execution B 302 by the worker manager 140. Based on this detection, the task execution B 302, at (15), begins processing a subsequent data portion of the target data. For example, if task execution B 302 is the second task execution within a series of task executions for processing the target data, the task execution B 302 may begin processing a second portion of the target data. Illustratively, the task execution B 302 may begin processing a relevant portion of the target data by calling a deserialization function within the serializable data processing code, which reads state information as passed to the task execution B 302, and begins processing a relevant portion of data as indicated within the state information. As noted above, the specific data processing implemented by task executions may vary across embodiments of the present disclosures, and thus interactions related to such processing are not shown in FIGS. 3A and 3B.

After processing a subsequent portion of the target data, the task execution B 302 may determine whether any additional portions of the target data remain to be processed. For example, the task execution B 302 may determine whether the portion of the target data processed by the task execution B 302 corresponds to a final portion of the target data. If so, the task execution B 302 may generate a request for an additional execution of the task corresponding to the serializable data processing code, and transmit that request to the frontend 120, in a manner similar to interactions (11) and (12), above. The frontend 120 may in turn transmit instructions to the worker manager 140 to initiate the additional execution in a manner similar to those described above. Thus, interactions (10) through (15) may be repeated any number of times, such that each portion of the target data is processed by a task execution on the on-demand code execution system 110.

However, for brevity, it will be assumed in FIG. 3B that the task execution B 302 completes processing a final portion of the target data. Thus, at (16), the task execution B 302 detects that processing of the target data is complete. The task execution B 302 therefore writes a result of the data processing to the data service 108 at (17). Illustratively, where the task executions 302 correspond to code for generating an MD5 checksum, the result of task execution B 302 may be a checksum for the target data. Where the task executions 302 correspond to other data processing tasks, such as video transcoding, the result may indicate other information, such as an indication that such data processing is complete, or a location within the data storage service 108 to which processed or encoded data was written by the task executions 302 during processing of portions of the target data.

Thus, according to the interactions of FIGS. 3A and 3B, the on-demand code execution system 110 is enabled to process large sets of target data across multiple, duration-limited task executions, such that no individual task execution exceeds a duration-limit of the on-demand code execution system 110.

While illustrative interactions are depicted in FIGS. 3A and 3B, the specific interactions implemented by the on-demand code execution system 110 may vary across embodiments of the present application. For example, partitioning of target data into portions is described as occurring during an initial execution of the task described above, with portioning information passed as state information between executions. However, in other embodiments, each execution of the task may determine the portion of the target data to be processed independently of state information passed between executions. For example, where each execution is configured to process a portion of size x (e.g., in bits) of a target file, an nth execution of a task may process bits of the file from bit x*(n−1) (e.g., where zero represents the first bit in the file) to bit (x*n)−1. Because each execution may independently determine the relevant bits for processing, partitioning information need not be passed between executions (though state information identifying a to-be-processed partition or last processed partition number may nevertheless be passed between the executions). Various other modifications and alterations of the interactions of FIGS. 3A and 3B are also possible in accordance with the embodiments described herein. Thus, the interactions of FIGS. 3A and 3B are intended to be illustrative in nature.

Figure 4:
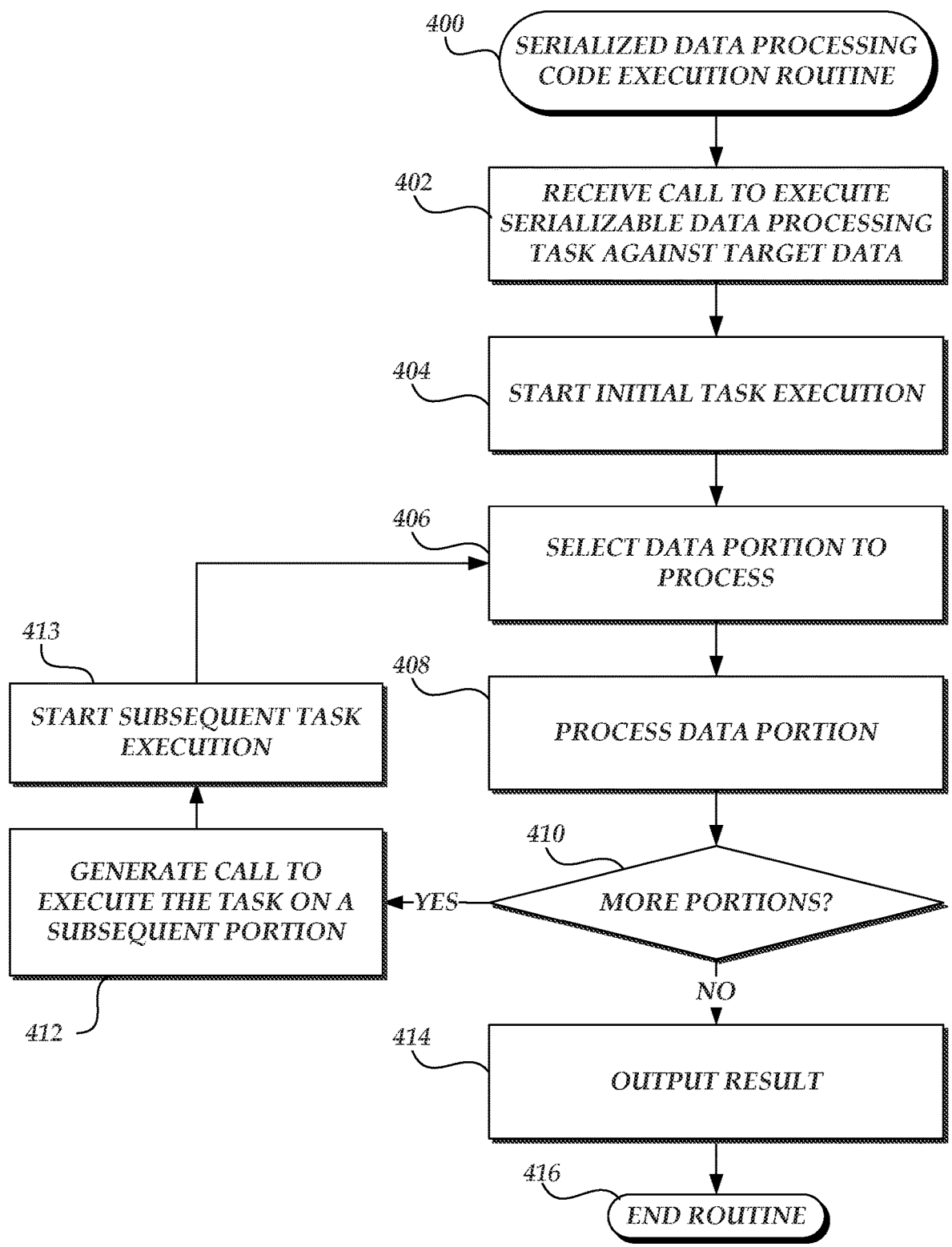
FIG. 4 is a flow chart depicting an illustrative routine for enabling a worker manager within the on-demand code execution system of FIG. 1 to implement serialized execution of code for processing a set of data across multiple duration-limited task executions.

With reference to FIG. 4, an illustrative routine 400 is depicted for serialized execution of data processing code, across multiple duration-limited task executions. The routine 400 may be implemented, for example, by the on-demand code execution system 110 of FIG. 1.

The routine 400 begins at block 402, where the on-demand code execution system 110 receives a call to execute a task corresponding to serializable data processing code against a target data set. As noted above, the serializable data processing code can generally correspond to code that, when executed as a task on the on-demand code execution system 110, causing the on-demand code execution system 110 to process a fixed portion of a target data set, and to call for an additional execution of the task if additional portions remain within the target data set. The serializable data processing code may be submitted, for example, by a user device 102 based on libraries or other code supplied by the on-demand code execution system 110.

At block 404, the on-demand code execution system 110 begins an initial execution of the task. Illustratively, a worker manager 140 may locate an execution environment in which to load the code, and then cause the code to be executed within the execution environment.

At block 406, the initial task execution (e.g., the on-demand code execution system 110 as configured due to executing code of the task for a first time) selects a portion of the target data for processing within the initial task execution. As discussed above, the portion may be selected based on partitioning the target data set into a number of portions of fixed length, where the fixed length is selected such that a portion can be processed by the task execution without exceeding a duration limit of task executions on the on-demand code execution system 110. Thus, the initial task execution may select, at block 406, a first portion of the target data set (e.g., spanning from a first bit of the target data set and covering a portion of the fixed length) for processing.

At block 408, the initial task execution processes the selected data portion, by implementing data processing as defined within the code of the task. Illustratively, the initial task execution may apply a hash algorithm (such as the MD5 hash algorithm) to the selected data portion, or may process audio or video content within the data portion according to a video encoding algorithm. The functionality of data processing can vary depending on the type of data processing, and such data processing may include any number of operations within the on-demand code execution system 110, communications with other systems, etc. For simplicity, these interactions are not shown within FIG. 4 or discussed in detail herein.

At block 410, the initial task execution determine whether more, not yet processed portions of the target data set exist. Illustratively, the initial task execution may make such a determination by detecting whether a portion processed by the initial task execution reaches the end of the target data set. If so, the routine 400 proceeds to block 414, where the initial task execution outputs a result of the processing (e.g., an indication of success/failure, a checksum, etc.). The routine 400 may then end at block 416.

For the purposes of the present description, however, it will be assumed that at least one additional portion of the target data set remains at block 410 to be processed. Thus, the routine 400 proceeds to block 412, where the initial task execution generates a call to execute the task with respect to a subsequent portion of the target data set. The call may be generated, for example, by calling serialization function specified within code of the task, which encodes state data of the initial task execution for transmission within a call to execute an additional instance of the task. In the illustrative example of a task that calculates an MD5 checksum, for example, a serialization function may generate a call that includes a current value of the 128 bit checksum of the MD5 algorithm, the last portion of the target data set processed by the MD5 algorithm, and any remainder bits of the last portion not processed by the MD5 algorithm (e.g., because such bits do not constitute a 512 bit chunk as required by the MD5 algorithm). Generally described, state data may include any information necessary to a subsequent task execution in order to begin processing the target data set at a next portion. Where processing of each portion is independent of processing of other portions, state data for an execution may simply identify the portion processed by that execution.

At block 413, the on-demand code execution system 110 initiates an additional execution of the task, based on the generated call. Initiation of an additional execution may include, for example, execution of a deserialization function of the task. As discussed above, the deserialization function can correspond to code that, when executed by the on-demand code execution system 110, causes the system 110 to read state data within a task call and to begin processing a subsequent portion of a target data set based on the state data. Accordingly, the routine 400 returns to block 406, where the additional execution selects a data portion for processing, and processes the data portion at block 408, as described above. The routine 400 may continue in this manner until no additional portions of the data set remain for processing, as determined at block 410. At that point, the routine 400 proceeds to block 414, as described above, and then ends at block 416.

While embodiments are described above with reference to processing a target data set within fixed-length portions, embodiments of the present disclosure can further enable serialization of task executions based on serialization points within iterative code, as described below. Specifically, where code includes iterative processing (such as a "for" or "while" loop), the on-demand code execution system 110 may enable a user to specify a serialization point within the iterative process, such that if the point is reached near an end of a duration limit of at task execution, the task execution will generate a call for a new execution of the task, and then halt. The on-demand code execution system 110 may further enable a user to specify a serialization function to be used in generating the call, which function may encode state information regarding a present task execution for inclusion within the call. The on-demand code execution system 110 may further enable a user to specify a deserialization function to be called under the new execution of the task, to resume the iterative process based on state information obtained from a prior execution.

Figure 5A:
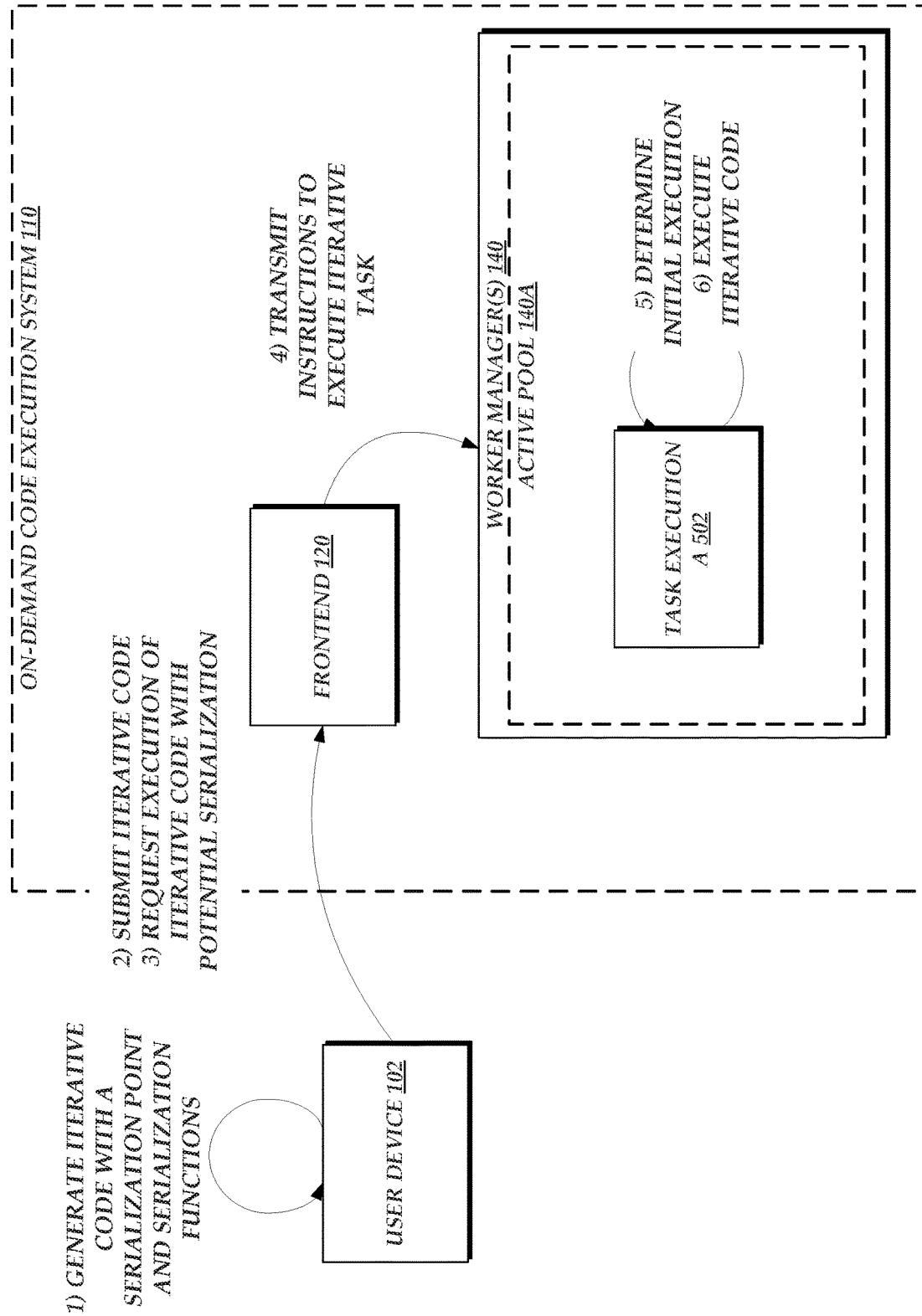
FIGS. 5A and 5B are flow diagrams depicting illustrative interactions for serializing execution of iterative code, such that the data is processed across multiple duration-limited task executions on the on-demand code execution system of FIG. 1, based on serialization points detected when during individual duration-limited task executions.
Figure 5B:
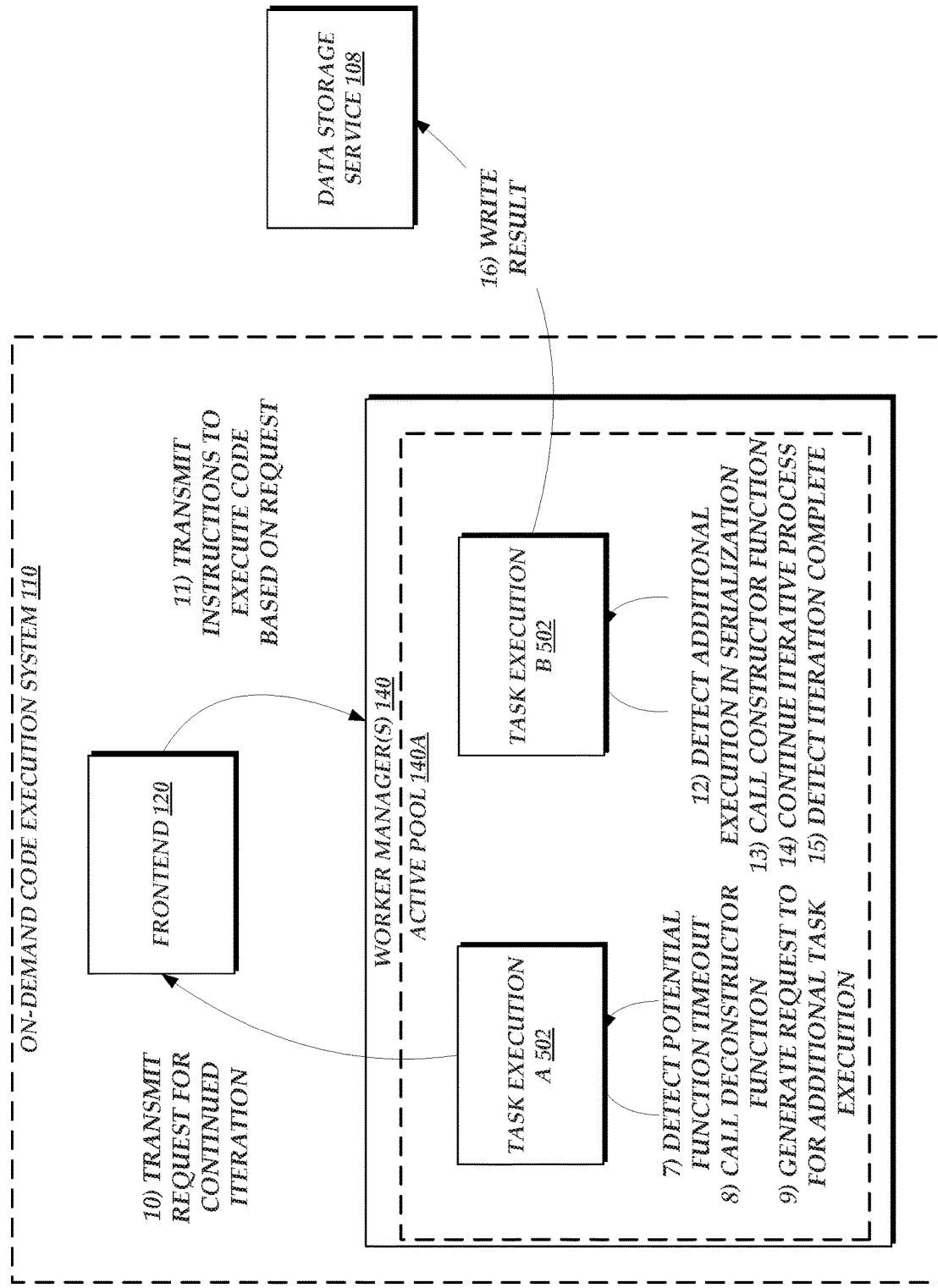

Interactions for use of serialization points within a task execution on the on-demand code execution system 110 are depicted within FIGS. 5A and 5B. Specifically, FIG. 5A depicts interactions for submitting code designating serialization points, and for initiating execution of a task corresponding to that code on the on-demand code execution system 110. FIG. 5B depicts interactions for detecting a serialization point during an execution, determining that the execution is nearing a duration limit on the on-demand code execution system 110, and generating a call to execute an additional execution of the task to resume iteration based on a state of the current execution (after which the current execution of the task may be halted). Thus, the interactions of FIGS. 5A and 5B can enable serialization of iterative processing within multiple, duration-limited task executions on the on-demand code execution system 110.

The interactions referenced above begin at (1) of FIG. 5A, where a user device generates iterative code, including a serialization point designated within an iterative portion of the code (e.g., a loop), a serialization function, and a deserialization function. As discussed above, iterative code often repeats for a non-fixed number of iterations, and as such, may execute for a non-fixed amount of time. As such, some executions of such code may exceed a duration limit of the on-demand code execution system 110, resulting in intermittent failure of task executions. To address this, a user (using a user device 102) may designate one or more serialization points within the iterative code, which instruct the on-demand code execution system 110, when such a point is reached during a task execution, to determine whether a current duration of the task execution is approaching or near a duration limit of the execution. If so, the on-demand code execution system 110 may cause a serialization function to be called. As also discussed above, the serialization function may be generated by a user, and include code causing a task execution to record current state information of an iterative process (e.g., values of variables used in the process, such as current iteration number of the process). Thereafter, the on-demand code execution system 110 may generate a call to state a new execution of the task, and pass the state information generated by the serialization function within the call. A user may further define a deserialization function, which causes the on-demand code execution system 110 to use the state information within a call (if present) to resume the iterative process (e.g., from a location corresponding to the serialization point at which a past execution halted the iterative processes).

After generating code corresponding to the iterative process, including one or more serialization points, the serialization function, and the deserialization function described above, the user device 102 submits the iterative code to the frontend 120, at (2), as a task on the on-demand code execution system 110. Concurrently or at a later time, the user device 102 may also, at (3), transmit to the frontend 120 a request for execution of the task. In some instances, the request may designate the request as potentially utilizing serialization, such that the on-demand code execution system 110 implements the functionalities described below. In other instance, the on-demand code execution system 110 may automatically determine that serialization may be utilized, based on the inclusion of serialization points within code of the task. While the request to execute the task is illustratively shown as transmitted by the user device 102, task executions may be triggered according to any number of criteria, as discussed above.

At (4), the frontend 120 transmits instructions to the worker manager 140 to execute the task within a device of the active pool 140A. At (5), the worker manager 140 initiates an execution of the code as a task within the active pool 140A. That task execution is shown as task execution A 502 within FIG. 5A.

As noted in the '556 Patent, the frontend 120 may undertake various functionalities prior to transmitting the instructions to the worker manager 140, such as queuing the requested execution, identifying the worker manager 140 to receive the instructions, etc. Similarly, the worker manager 140 may undertake various functionalities prior to or as part of initiating a task execution, such as selecting or generating an execution environment for the task. These functionalities are excluded for brevity, but are discussed in more detail within the '556 Patent, incorporated by reference above. Thus, one skilled in the art will appreciate that the interactions of FIGS. 5A and 5B have been simplified for ease of description.

At (5), the task execution A 502 determines that this execution corresponds to an initial execution of the iterative task. Illustratively, this determination may be based on the format of the instructions to execute the task (e.g., because the instructions exclude state information of a prior execution of the iterative task). As such, the task execution A 502 begins executing the code corresponding to the task without use of a deserialization function. (One of skill in the art will appreciate that, even when a deserialization function is not implemented by a task execution, the task execution may nevertheless implement other types of deserialization functions, as various types of deserialization functions are known within the art). Thereafter, at (6), the task execution A 502 begins the iterative process defined within code of the function (such as by entering a loop defined within the code). As will be appreciated by one skilled in the art, execution of an iterative process may include any number of operations within the on-demand code execution system 110 or communications with other systems. For brevity, these operations and communications are not depicted in FIG. 5A or described herein.

The interactions of FIG. 5A are continued with reference to FIG. 5B. As shown in FIG. 5B, the task execution A 502, at (7), detects a potential timeout of the task execution, as the execution is approaching a duration limit on the on-demand code execution system 110. Illustratively, the potential timeout may be determined based on reaching a serialization point within the code of the task execution A 502. For example, each time a serialization point within the code is reached, the on-demand code execution system 110 may be configured to determine remaining duration allowed to the task execution under the duration limit of the system 110. If the remaining duration is under a threshold amount, the on-demand code execution system 110 may detect a potential timeout of the task execution. In one embodiment, the threshold duration is predetermined, such as by an administrator of the on-demand code execution system 110 or a user of the user device 102. In another embodiment, the threshold may be set based on a frequency of serialization points occurring during the task execution. For example, the on-demand code execution system 110 may be configured to monitor the occurrence of serialization points during the task execution, and to set the threshold duration based on that frequency (e.g., at a value equal to or lower than a maximum time between sequential occurrences of the serialization points).

Thereafter, at (9), the task execution A 502 calls the serialization function of the task's code. As discussed above, the serialization function may contain code executable during the task execution to encode a current state of the task execution A 502 for transmission to an additional execution. The current state may include, for example, an iteration number of the task execution A 502 and a state of any variables within the task execution A 502 that may be necessary to resume iterative processing within an additional task execution. At (9), the task execution A 502 generates a request to the on-demand code execution system 110 to initiate a second execution of the task, to continue the iterative processing started within the task execution A 502. Illustratively, the task execution A 502 may generate the request within the serialization function.

At (10), the request generated by the task execution A 502 is transmitted to the frontend 120. The task execution A 502 may thereafter end, such that the task execution A 502 does not exceed a duration limit for task executions on the on-demand code execution system 110.

The frontend 120 then, at (11), transmits an instructions to execute an additional instance of the task to the worker manager 140. The instructions may include, for example, state information included within the request, as generated by the task execution A 502. While the request is illustrated as passing through the frontend 120, in some embodiments a task execution 502 may be configured to communicate directly with a worker manager 140 to initiate execution of a task, and thus communication with the frontend 120 may be unnecessary.

In response to the instructions, the worker manager 140 initiates an additional task execution, depicted as task execution B 502. As noted above, the worker manager 140 may implement various functionalities prior to or as part of initiating a task execution, such as selecting or generating an execution environment for the task. These functionalities are excluded for brevity, but are discussed in more detail within the '556 Patent, incorporated by reference above. In the context of the present application, because task execution B 502 is an additional execution of a task previously executed by the worker manager 140 (task execution A 502), the worker manager 140 may, for example, initiate the task execution B 502 within an execution environment already used by the task execution A 502. Thus, the worker manager 140 may not be required to generate a new execution environment for the task execution B 502.

At (14), the task execution B 302 detects that it is an additional task execution for an iterative process. This detection may be based, for example, on identification of state information of a prior task execution within the instructions to initiate the task execution B 502, which may be passed to the task execution B 502 by the worker manager 140. Based on this detection, the task execution B 502, at (13), executes a deserialization function corresponding to the task (e.g., as defined within code of the task). As noted above, the deserialization function may correspond to code executable within the on-demand code execution system 110 to resume an iterative process started under a prior task execution, based on the state information. For example, the deserialization function may initialize variables used during the iterative process with values included in the state information. Thereafter, at (14), the task execution B 502 may continue the iterative process defined within code of the task. As noted above, the operations and communications implemented by an iterative process may vary across embodiments of the present disclosures, and thus interactions related to such iterative processing are not shown in FIGS. 5A and 5B.

Thereafter, the task execution B 502 may continue the iterative process, and at each serialization point, the on-demand code execution system 110 may determine whether the task execution is approaching a duration limit for executions. If so, the task execution B 502 may call a serialization function, generate a request for an additional execution of the task, and transmit that request to the frontend 120, in a manner similar to interactions (8) through (10), above. The frontend 120 may in turn transmit instructions to the worker manager 140 to initiate the additional execution in a manner similar to those described above. Thus, interactions (8) through (14) may be repeated any number of times, such that the iterative process is continued across multiple task executions.

However, for brevity, it will be assumed in FIG. 5B that the task execution B 502 completes the iterative process defined within code of the task. Thus, at (15), the task execution B 502 detects that the iterative process is complete. The task execution B 502 therefore writes a result of the iterative process to the data storage service 108 at (16). Illustratively, the result may include an indication that such the iterative processing is complete, or a location within the data storage service 108 to which processed or encoded data was written by the task executions 502 during processing of portions of the target data.

Thus, according to the interactions of FIGS. 5A and 5B, the on-demand code execution system 110 is enabled to continue iterative processes across multiple, duration-limited task executions, such that no individual task execution exceeds a duration-limit of the on-demand code execution system 110.

Figure 6:
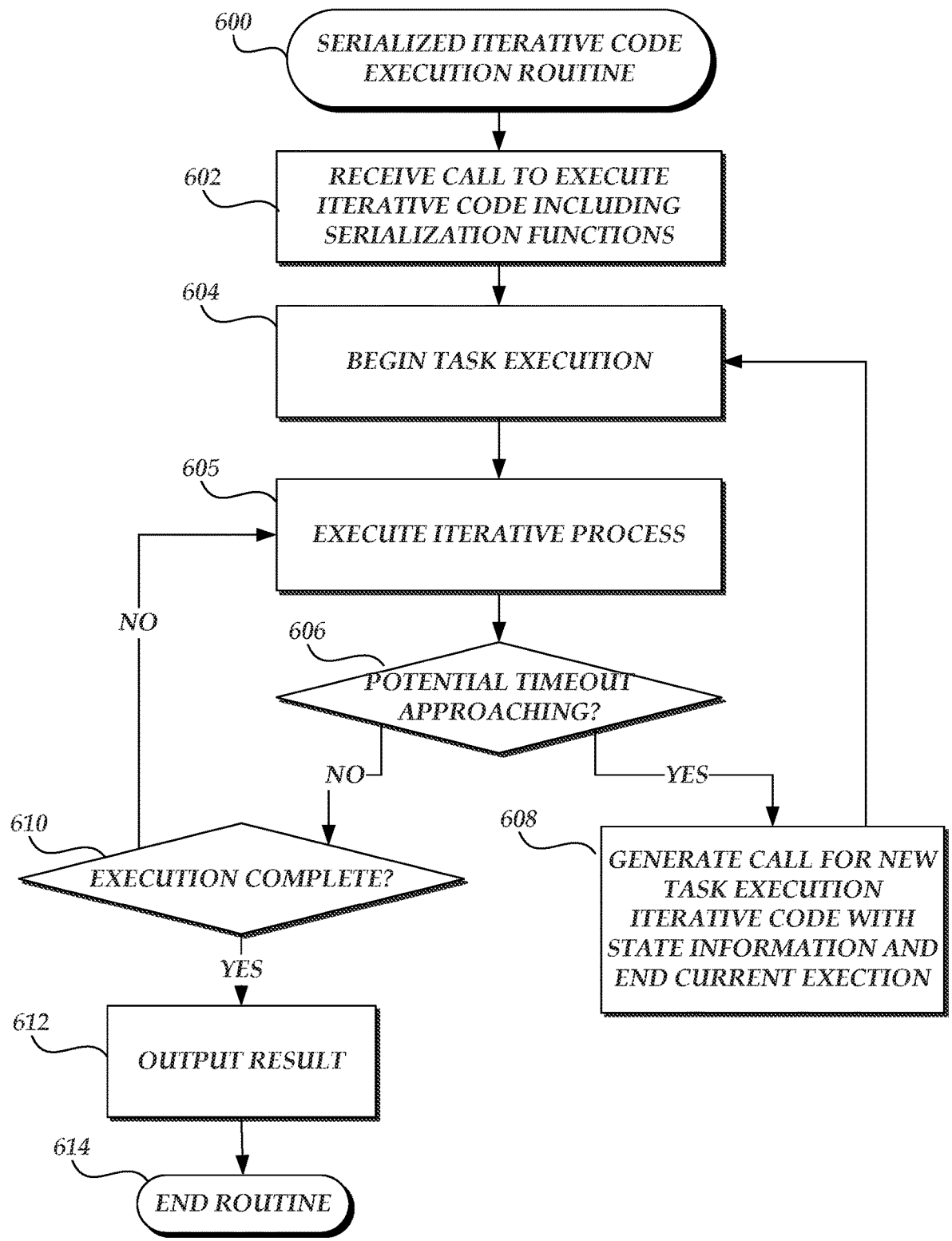
FIG. 6 is a flow chart depicting an illustrative routine for enabling a worker manager within the on-demand code execution system of FIG. 1 to implement serialized execution of iterative code based on serialization points detected when during individual duration-limited task executions.

With reference to FIG. 6, an illustrative routine 600 is depicted for serialized execution of iterative code, across multiple duration-limited task executions. The routine 600 may be implemented, for example, by the on-demand code execution system 110 of FIG. 1.

The routine 600 begins at block 602, where the on-demand code execution system 110 receives a call to execute a task corresponding to serializable iterative code. As noted above, the serializable iterative code can generally correspond to code that defines one or more serialization points within an iterative process (e.g., a loop), as well as a serialization function and deserialization function. The serializable iterative code may be submitted, for example, by a user device 102 based on libraries or other code supplied by the on-demand code execution system 110.

At block 604, the on-demand code execution system 110 begins an initial execution of the task. Illustratively, a worker manager 140 may locate an execution environment in which to load the code, and then cause the code to be executed within the execution environment. At block 605, the on-demand code execution system 110 executes the iterative process, as defined within the code. The specific interactions or communications required for execution of user-defined code may vary across embodiments, and are not shown in FIG. 6 or described herein.

At block 606, the initial task execution (e.g., the on-demand code execution system 110 as configured due to executing code of the task for a first time) reaches a serialization point, as defined within the code. Illustratively, the serialization point may be indicated within a "timeout detection" function call, which function may be provided by a library made available at the on-demand code execution system. For example, the serialization point may be indicated by a call to the function "detect timeout( )" On reaching the serialization point, the on-demand code execution system 110 may determine whether a potential timeout for the task execution is approaching. For example, the on-demand code execution system 110 may determine whether the timeout is within a threshold time from a current time. In one embodiment, the threshold time may be predefined (e.g., by the on-demand code execution system 110 or by the code of the task). Illustratively, the timeout period may be 10 seconds. In another embodiment, the threshold time may vary according to the task or task execution. Illustratively, the threshold time may be set to be less than an average or maximum duration of a single iteration of the iterative code, such that if at least one additional iteration of the iterative code can be completed before exceeding a duration limit of the task execution, the threshold time is not met. Such a threshold may be set, for example, based on historical information of the frequency of reaching serialization points within the code of the task, either based on a current execution or historical executions on the on-demand code execution system 110.

If, at block 606, a timeout is not within the threshold distance, the routine 600 continues to block 610. At block 610, the on-demand code execution system 110 determines whether the task execution is complete (e.g., whether the iterative process as defined within code of the task has reached an exit condition). If so, the routine 600 proceeds to block 612, where the initial task execution outputs a result of the processing (e.g., an indication of success/failure, a checksum, etc.). The routine 600 may then end at block 614.

For the purposes of the present description, however, it will be assumed that the execution has not completed on initially reaching block 610. Thus, the routine 600 returns to block 605, where the task execution continues.

Thereafter, the routine 600 returns to block 606, where the on-demand code execution system 110 determines, at a serialization point, whether a potential timeout is approaching. If so, the task execution may be in danger of exceeding the duration limit before a next serialization point occurs, and thus being halted prematurely. The routine 600 therefore proceeds to block 608, where the task execution generates a call to the on-demand code execution system 110 to initiate an additional execution of the task. To facilitate the additional execution, the task execution may generate state information identifying a current state of the iterative process, and include the state information in the call, such that an additional execution can resume the iterative process based on the state information. In one embodiment, the call may be generated by the task execution by calling a serialization function, which is executable by the on-demand code execution system 110 to encode a current state of the iterative process (e.g., the values of variables used within the iterative process), and to include that encoded state information within a call to execute a new instance of the task.

Thereafter, the routine returns to block 604, where the on-demand code execution system 110 executes a new instance of the task, with a newly instantiated duration limit. The prior task execution may then end, without exceeding the duration limit of the on-demand code execution system 110. To facilitate resuming the iterative process of the prior task, the additional task execution can utilize state information within the call generated by the prior execution in order to initialize the additional task execution to a state of the prior task execution, as indicated within the state information. For example, the additional task execution may utilize state information included within the call to initialize a state of variables used in the iterative process. In one embodiment, this initialization is achieved by calling a deserialization function defined within code of the task. Illustratively, this deserialization function may be called based on detection of state information of a prior execution within the call to execute the task.

Thereafter, the routine 600 proceeds to block 605, where the iterative process, as started under a prior execution, is resumed. The routine 600 may then proceed as described above, until execution completes at block 610. The routine 600 then proceeds to block 612, where the initial task execution outputs a result of the processing (e.g., an indication of success/failure, a checksum, etc.). The routine 600 then ends at block 614.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system to implement data processing code in an on-demand code execution system, wherein the on-demand code execution system generates one or more execution environments in which to execute tasks corresponding to the data processing code, and wherein task executions on the on-demand code execution system are subject to a per-execution duration limit, the system comprising:
    a non-transitory data store configured to store the data processing code, wherein the data processing code, when executed as a task within an execution environment, causes the on-demand code execution system to conduct data processing against a target data set of a fixed size, wherein an individual execution of the task conducts data processing against a portion of the target data set and, if additional portions of the target data set remain for processing, calls for an additional execution of the task on the on-demand code execution system; and
    one or more processors in communication with the non-transitory data store and configured with computer-executable instructions to:
        receive a request to execute the task to process the target data set, the request identifying the target data set;
        initiate an initial execution of the task on the on-demand code execution system, wherein the initial execution of the task is subject to the per-execution duration limit established by the on-demand code execution system, and wherein the initial execution of the task instructs and causes the on-demand code execution system to:
            initiate processing of the target data set by conducting the data processing against a first portion of the target data set, the first portion of the target data set selected to enable the initial execution of the task to complete the data processing against the first portion prior to expiration of the duration limit;
            detect that the data processing against the first portion has completed;
            determine that a second portion of the target data set exists for which the data processing has not yet completed;
            responsive to detecting that the data processing against the first portion has completed:
                generate state information identifying a state of the initial execution of the task on completion of the data processing against the first portion; and
                transmit a call from the initial execution to the on-demand code execution system to resume processing of the target data set by initiating an additional execution of the task, the call including the state information; and
        initiate the additional execution of the task on the on-demand code execution system, wherein the additional execution of the task causes the on-demand code execution system to identify the second portion based at least in part on the state information and resume the processing of the target data set by conducting the data processing against the second portion, and wherein the additional execution of the task is subject to the per-execution duration limit established by the on-demand code execution system.

2. The system of claim 1, wherein the data processing corresponds to at least one of video encoding, audio encoding, or application of a hashing algorithm.

3. The system of claim 2, wherein the hashing algorithm is an MD5 hashing algorithm, and wherein the state information includes a 128-bit hash value.

4. The system of claim 3, wherein the state information includes a value of one or more bits of a final section of the first portion not constituting a 512-bit chunk.

5. The system of claim 1, wherein the state information is formatted as JavaScript Object Notation (JSON) data.

6. A computer-implemented method comprising:
    obtaining data processing code executable as a task on an on-demand code execution system to process a target data set, wherein executions of the task are subject to a per-execution duration limit on the on-demand code execution system, and wherein an individual execution of the task instructs and causes the on-demand code execution system to:
  initiate processing of the target data set by conducting data processing against a portion of the target data set of a fixed size, the portion selected to enable the individual execution to complete the data processing against the portion prior to expiration of the duration limit;
  detect that the data processing against the portion has completed;
  determine whether an additional portion of the target data set exists for which the data processing has not yet completed; and
  responsive to detecting that the data processing against the portion has completed, if the additional portion of the target data set exists for which the data processing has not yet completed:
    generate state information regarding a state of the individual execution on completion of the data processing against the portion; and
    transmit a call to the on-demand code execution system to resume processing of the target data set by initiating an additional execution of the task, the call including the state information;
  initiating a first execution of the task on the on-demand code execution system, wherein the first execution is subject to the per-execution duration limit on the on-demand code execution system, and wherein the first execution of the task causes the on-demand code execution system to initiate processing of the target data set by conducting the data processing against a first portion of a target data set and to determine that a second portion of the target data set exists for which the data processing has not yet completed;
  receiving a call generated by the first execution to resume processing of the target data set by initiating the additional execution of the task, the call including state information of the first execution; and
  initiating a second execution of the task on the on-demand code execution system, wherein the second execution is subject to the per-execution duration limit on the on-demand code execution system, and wherein the second execution of the task causes the on-demand code execution system to identify the second portion based at least in part on the state information of the first execution and resume the processing of the target data set by conducting the data processing against the second portion of the target data set wherein the second execution of the task executes during a period subsequent to expiration of an execution period for the first execution that is set according to the per-execution duration limit.

7. The computer-implemented method of claim 6, wherein the data processing corresponds to application of an MD5 hashing algorithm, and wherein the state information includes a 128-bit hash value produced by the MD5 hashing algorithm.

8. The computer-implemented method of claim 6, wherein the data processing code includes a serialization function callable to generate the state information regarding a state of a current execution, and wherein the first execution causes the on-demand code execution system to call the serialization function to generate the state information of the first execution.

9. The computer-implemented method of claim 6, wherein the data processing code includes a deserialization function callable to identify a portion of a target data set to be processed by a current execution, and wherein the second execution causes the on-demand code execution system to call the deserialization function to identify the second portion of the target data set from the state information of the first execution.

10. The computer-implemented method of claim 6, wherein the data processing code includes an alignment function callable to partition the target data set into a plurality of portions, wherein the first execution causes the on-demand code execution system to call the alignment function, and wherein the state information of the first execution includes information identifying the plurality of portions.

11. The computer-implemented method of claim 6, wherein the state information of the first execution includes a value of a variable defined within the data processing code.

12. The computer-implemented method of claim 6, wherein the second execution causes the on-demand code execution system to determine that a third portion exists for which the data processing has not yet completed, and wherein the computer implemented method further comprises:
  receiving a call generated by the second execution to initiate another execution of the task, the call generated by the second execution including state information of the second execution; and
  initiating a third execution of the task on the on-demand code execution system, wherein the third execution of the task causes the on-demand code execution system to identify the third portion based at least in part on the state information of the second execution and conducts the data processing against the third portion of the target data set.

13. The computer-implemented method of claim 6 further comprising determining the fixed size by:
  conducting the data processing on the of the target data set;
  detecting a size of the target data set that is processed in an amount of time not greater than the duration limit; and
  setting the fixed size based on the size of the target data set that is processed in an amount of time not greater than the duration limit.

14. Non-transitory computer-readable media comprising:
  data processing code executable as a task on an on-demand code execution system to process a target data set, wherein executions of the task are subject to a per-execution duration limit on the on-demand code execution system, and wherein an individual execution of the task instructs and causes the on-demand code execution system to:
    initiate processing of the target data set by conducting data processing against a portion of the target data set, the portion selected to enable the individual execution to complete the data processing against the portion prior to expiration of the duration limit;
    detect that the data processing against the portion has completed;
    determine whether an additional portion of the target data set exists for which the data processing has not yet completed; and
    responsive to detecting that the data processing against the portion has completed, if the additional portion of the target data set exists for which the data processing has not yet completed:

generate state information regarding a state of the individual execution on completion of the data processing against the portion; and transmit a call to the on-demand code execution system to resume processing of the target data set by initiating an additional execution of the task, the call including the state information; and management code executable by the on-demand code execution system, wherein the management code, when executed, causes the on-demand code execution system to:

initiate a first execution of the task on the on-demand code execution system, wherein the first execution is subject to the per-execution duration limit on the on-demand code execution system, and wherein the first execution of the task causes the on-demand code execution system to initiate processing of the target data set by conducting the data processing against a first portion of the target data set and to determine that a second portion of the target data set exists for which the data processing has not yet completed;

receive a call generated by the first execution to resume processing of the target data set by initiating the additional execution of the task, the call including state information of the first execution; and initiate a second execution of the task on the on-demand code execution system, wherein the second execution is subject to the per-execution duration limit on the on-demand code execution system, and wherein the second execution of the task causes the on-demand code execution system to identify the second portion based at least in part on the state information of the first execution and resume the processing of the target data set by conducting the data processing against the second portion of the target data set.

15. The non-transitory computer-readable media of claim 14, wherein the first execution of the task is initiated in response to a call to execute the task generated by at least one of a user computing device or a prior execution of the task on the on-demand code execution system.

16. The non-transitory computer-readable media of claim 14, wherein the data processing code includes a serialization function callable to generate the state information regarding a state of a current execution, and wherein the first execution causes the on-demand code execution system to call the serialization function to generate the state information of the first execution.

17. The non-transitory computer-readable media of claim 14, wherein the data processing code includes a deserialization function callable to identify a portion of a target data set to be processed by a current execution, and wherein the second execution causes the on-demand code execution system to call the deserialization function to identify the second portion of the target data set from the state information of the first execution.

18. The non-transitory computer-readable media of claim 14, wherein the data processing code includes an alignment function callable to partition the target data set into a plurality of portions, wherein the first execution causes the on-demand code execution system to call the alignment function, and wherein the state information of the first execution includes information identifying the plurality of portions.

19. The non-transitory computer-readable media of claim 14, wherein the state information of the first execution includes a value of a variable defined within the data processing code.

20. The non-transitory computer-readable media of claim 14, wherein the second execution determines that a third portion of the target data set exists for which the data processing has not yet completed, and wherein the management code, when executed, further causes the on-demand code execution system to:

receive a call generated by the second execution to initiate another execution of the task, the call generated by the second execution including state information of the second execution; and initiate a third execution of the task on the on-demand code execution system, wherein the third execution of the task causes the on-demand code execution system to identify the third portion based at least in part on the state information of the second execution and conducts the data processing against the third portion of the target data set.

* * * * *

UNITED STATES PATENT AND TRADEMARK OFFICE
CERTIFICATE OF CORRECTION

PATENT NO. : 10,725,826 B1
APPLICATION NO. : 15/629546
DATED : July 28, 2020
INVENTOR(S) : Sahil Sagar et al.

Page 1 of 1

It is certified that error appears in the above-identified patent and that said Letters Patent is hereby corrected as shown below:

In the Specification

In Column 26, Line 1, delete "execution o" and insert --execution--.

In Column 33, Line 51, delete ""detect timeout( )"" and insert --"detect_timeout()."--.

In the Claims

In Column 37, Line 49, Claim 6, delete "set" and insert --set,--.

In Column 38, Line 38, Claim 13, delete "on the of" and insert --of--.

Signed and Sealed this
Third Day of November, 2020

Andrei Iancu
*Director of the United States Patent and Trademark Office*